(12) United States Patent
Grosskrueger et al.

(10) Patent No.: US 6,298,786 B1
(45) Date of Patent: *Oct. 9, 2001

(54) FRANGIBLE ACCESS PANEL SYSTEM

(75) Inventors: Duane D. Grosskrueger, Highlands Ranch; John J. Smith, Littleton, both of CO (US)

(73) Assignee: Lockheed Martin Corporation, Bethesda, MD (US)

(*) Notice: Subject to any disclaimer, the term of this patent is extended or adjusted under 35 U.S.C. 154(b) by 0 days.

This patent is subject to a terminal disclaimer.

(21) Appl. No.: 09/388,902

(22) Filed: Sep. 2, 1999

Related U.S. Application Data

(63) Continuation-in-part of application No. 08/991,225, filed on Dec. 16, 1997, now Pat. No. 5,992,328, and a continuation-in-part of application No. 08/999,572, filed on Dec. 16, 1997, now Pat. No. 5,983,802, and a continuation-in-part of application No. 08/999,573, filed on Dec. 16, 1997, now Pat. No. 5,969,287.

(51) Int. Cl.$^7$ .................................................. F42B 15/10
(52) U.S. Cl. ............................................ 102/378; 102/377
(58) Field of Search ................................................ 102/378

(56) References Cited

U.S. PATENT DOCUMENTS

| | | | |
|---|---|---|---|
| 3,230,885 | 1/1966 | Weber et al. | 89/1.14 |
| 3,373,686 | 3/1968 | Blain et al. | 102/22 |
| 3,453,960 | 7/1969 | Qualls | 102/378 |
| 3,486,410 * | 12/1969 | Drexelius et al. | 102/378 |
| 3,633,456 | 1/1972 | Carr et al. | 102/378 |
| 3,698,281 | 10/1972 | Brandt et al. | 89/1 B |
| 4,137,848 | 2/1979 | Cunha | 102/378 |
| 4,685,376 | 8/1987 | Noel et al. | 89/1.14 |
| 4,930,422 | 6/1990 | Thouron et al. | 102/378 |
| 5,046,426 | 9/1991 | Julien et al. | 102/377 |
| 5,109,749 | 5/1992 | Olcer | 89/1.14 |
| 5,129,306 | 7/1992 | Fauvel | 89/1.14 |
| 5,331,894 | 7/1994 | Wassell et al. | 102/275.12 |
| 5,372,071 | 12/1994 | Richards et al. | 102/378 |
| 5,390,606 | 2/1995 | Harris | 102/378 |
| 5,392,684 | 2/1995 | Renfro et al. | 89/1.14 |
| 5,585,596 | 12/1996 | Richards et al. | 102/378 |
| 5,969,287 * | 10/1999 | Blain et al. | 102/378 |

* cited by examiner

*Primary Examiner*—Charles T. Jordan
*Assistant Examiner*—N. DiCostanzo
(74) *Attorney, Agent, or Firm*—Marsh Fischmann & Breyfogle LLP

(57) ABSTRACT

A frangible access panel separation system for separating an access panel from a host structure is disclosed. In one embodiment, the system includes first and second doublers for initially interconnecting the first and second sections, an expandable explosive system contained in a cavity defined by the first and second doublers and first and second sections, and first and second staggered grooves positioned on the first and second doublers, the first and second doublers severable along break planes defined by the first and second staggered grooves to facilitate a substantially collision-free separation and ejection of the first section relative to the second section, and a detonator member for initiating detonation thereof.

13 Claims, 17 Drawing Sheets

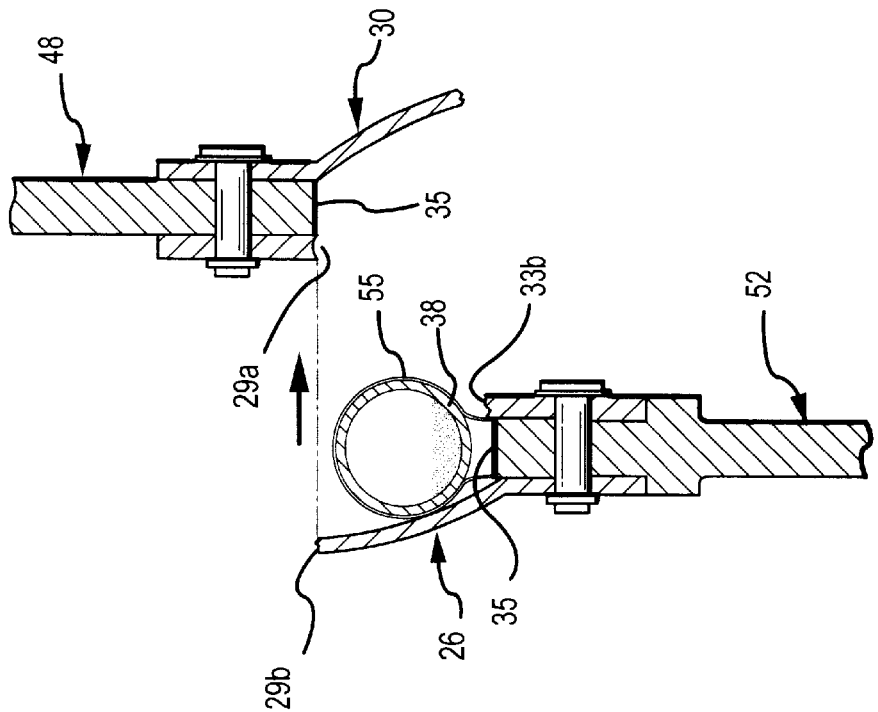
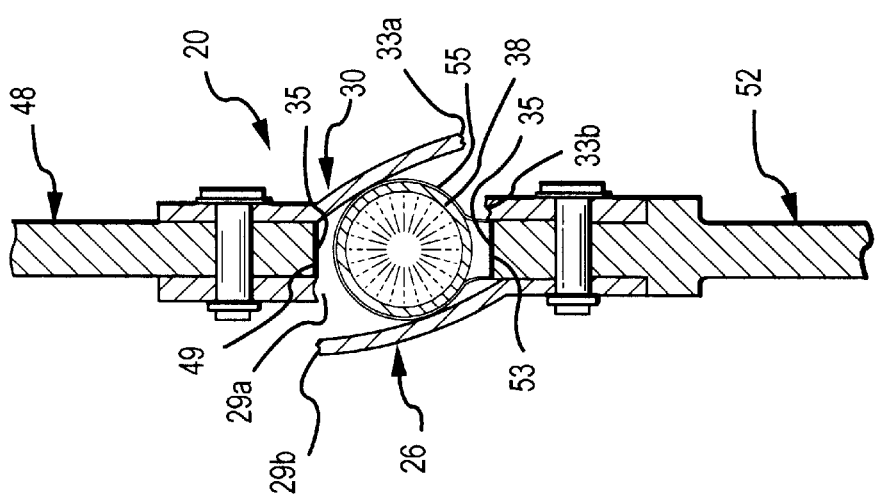
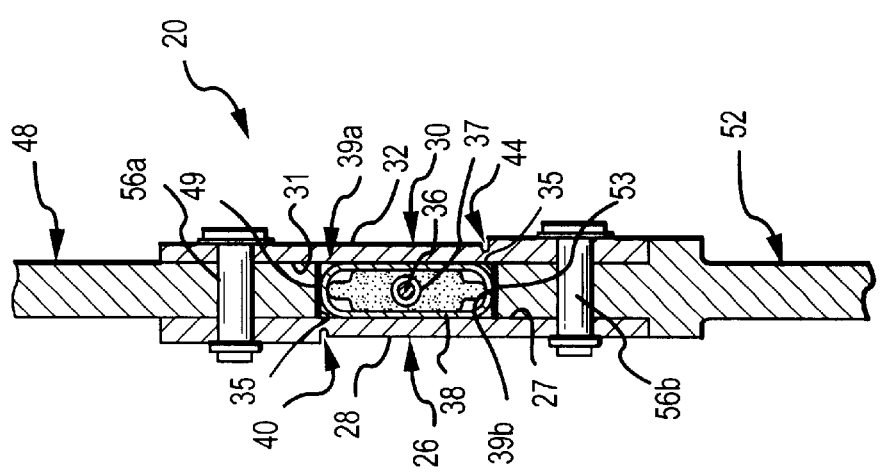

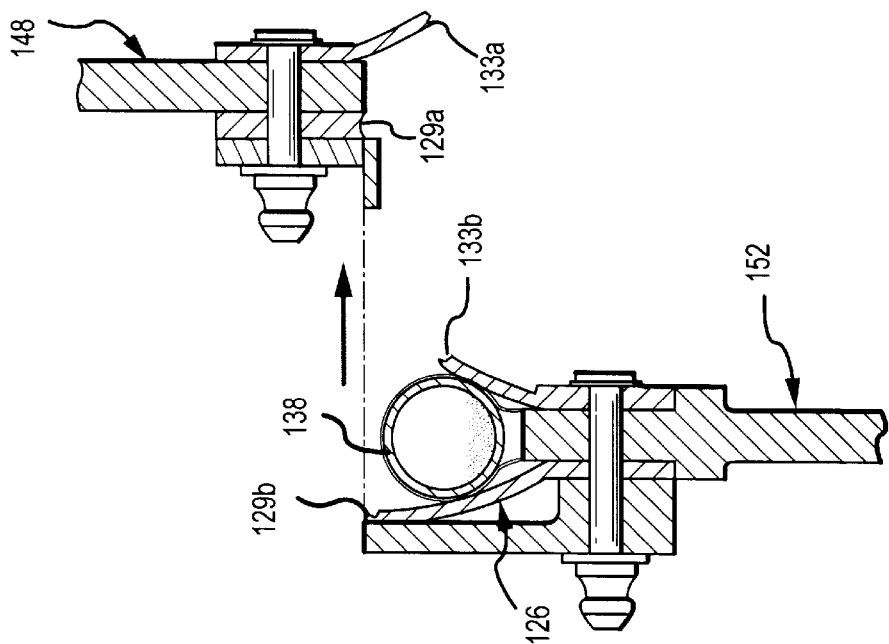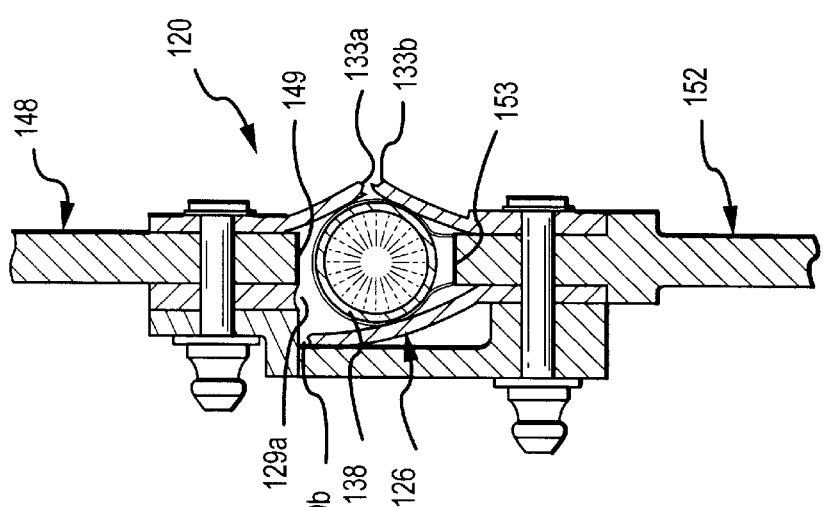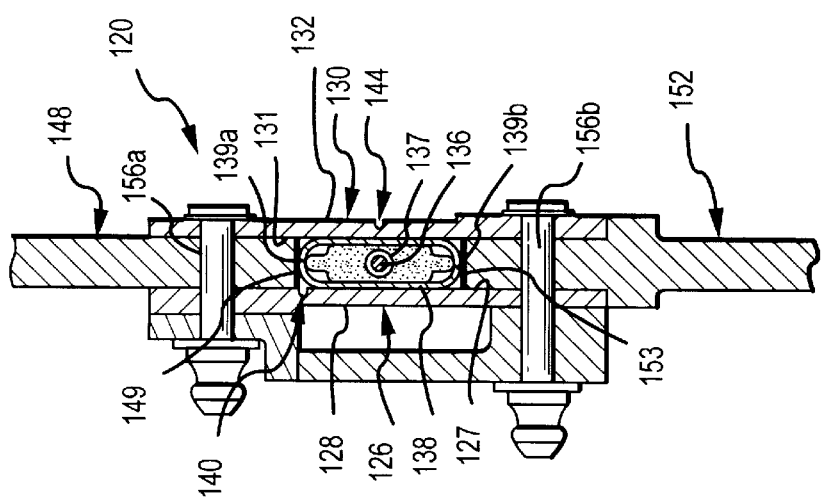

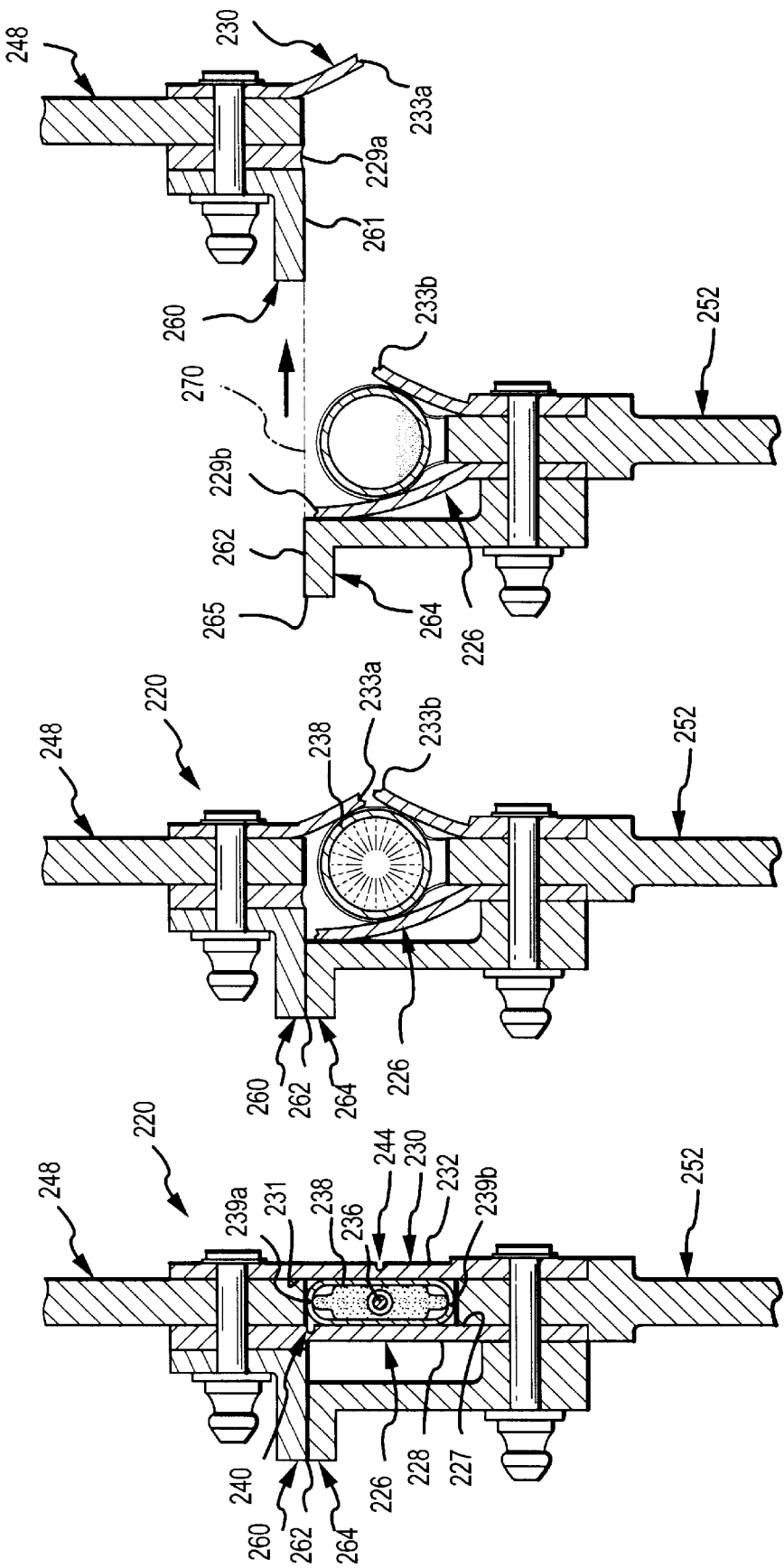

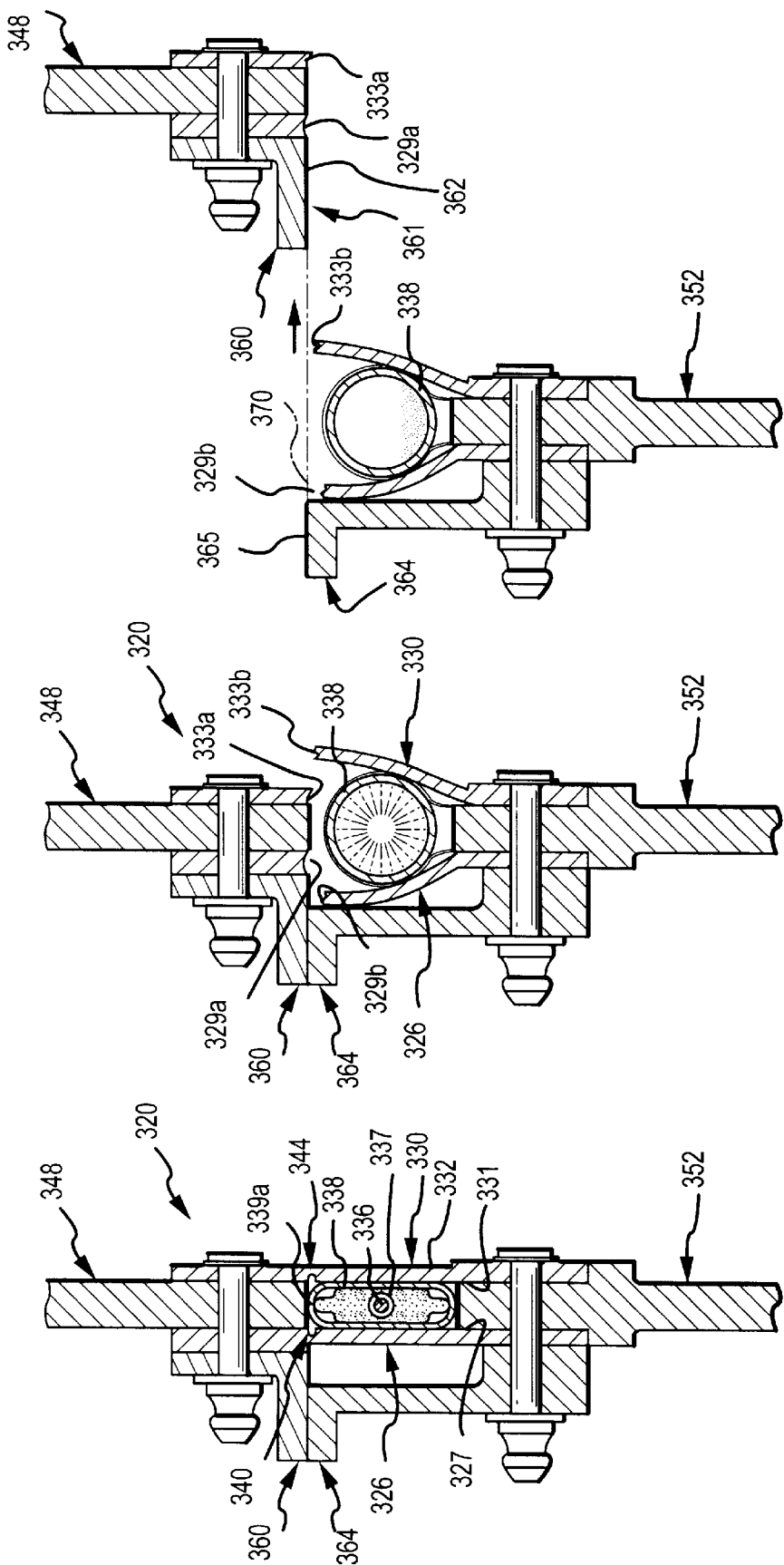

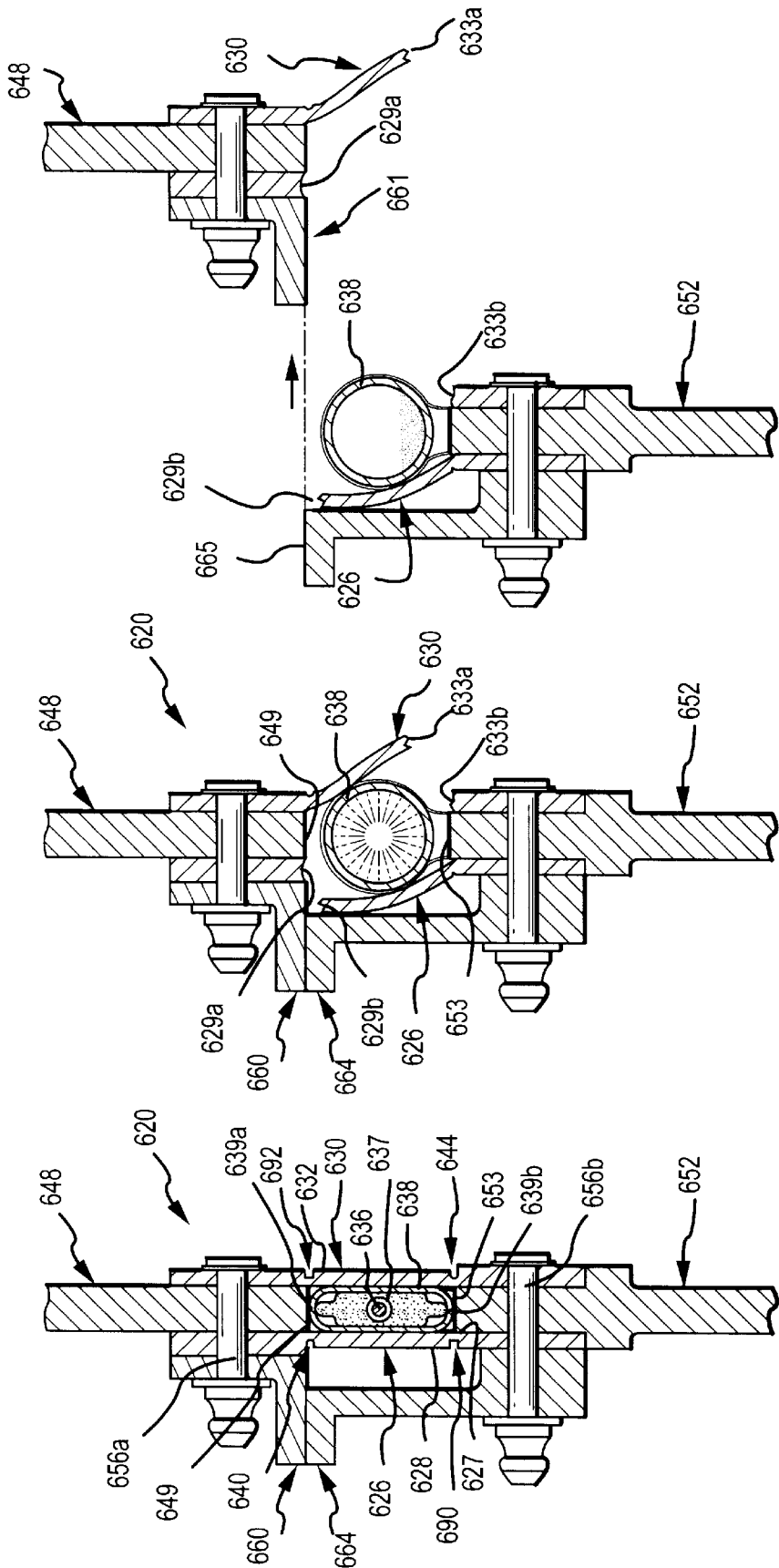

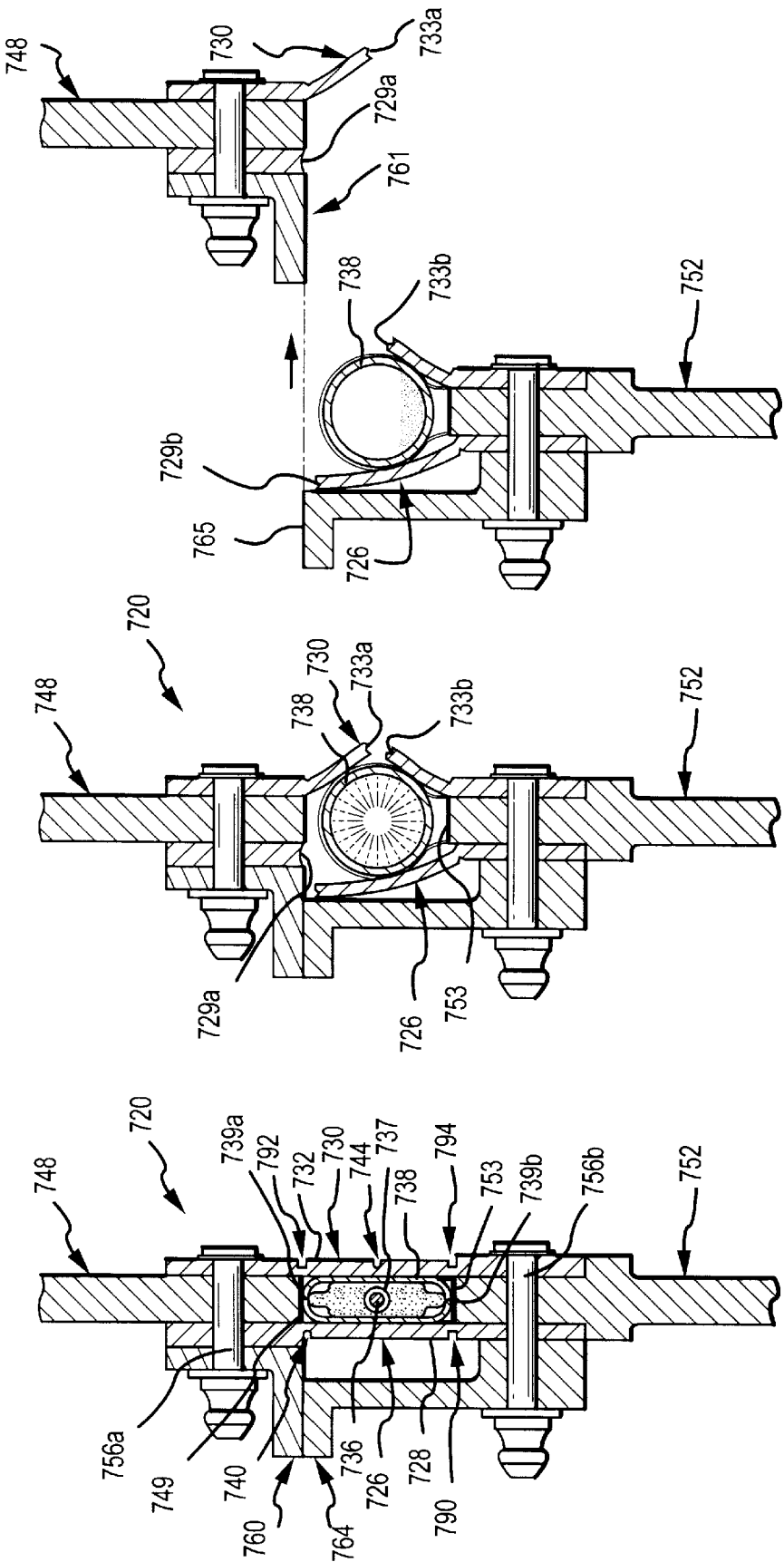

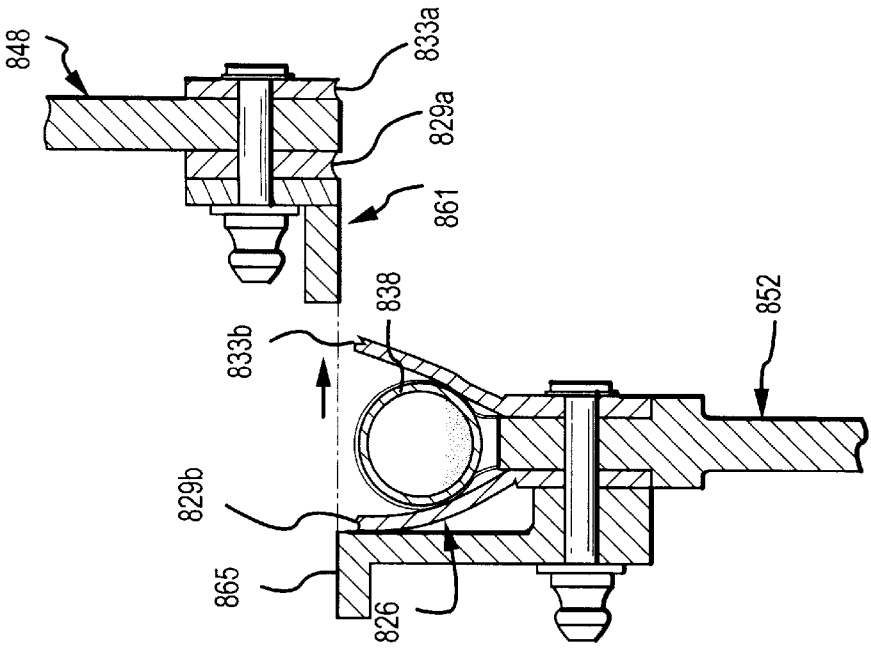
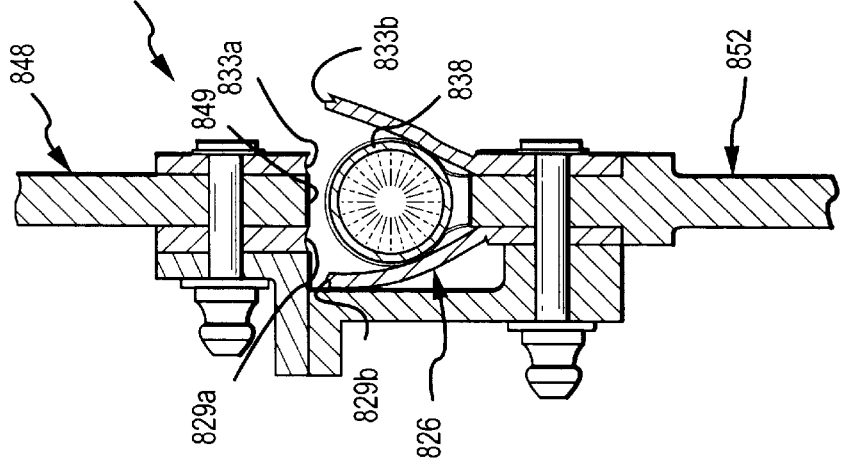
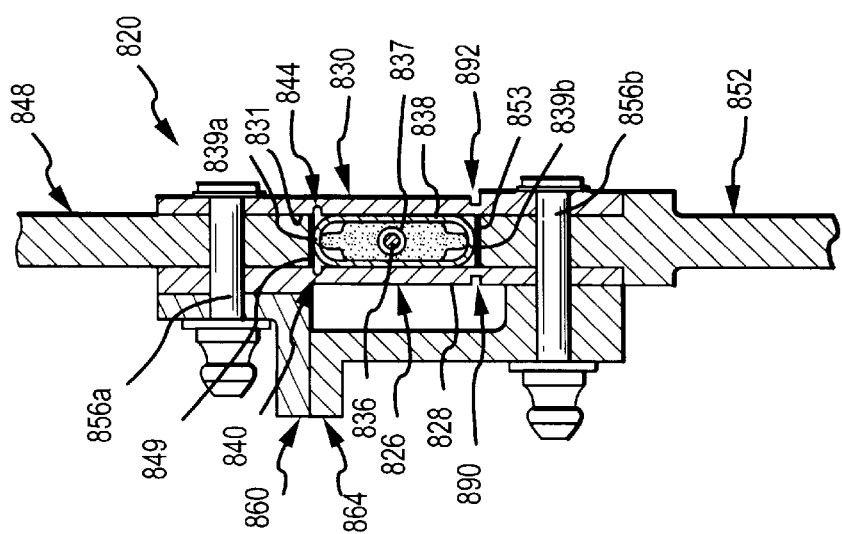

FRANGIBLE ACCESS PANEL SYSTEM

RELATED APPLICATIONS

This application is a continuation-in-part of U.S. patent application Ser. No. 08/991,225, filed on Dec. 16, 1997, now U.S. Pat. No. 5,992,328 U.S. patent application Ser. No. 08/999,572, filed on Dec. 16, 1997, now U.S. Pat. No. 5,983,802 and U.S. patent application Ser. No. 08/999,573, filed on Dec. 16, 1997 now U.S. Pat. No. 5,969,287.

GOVERNMENT RIGHTS

This invention was made with Government support under Contract No. F04701-95-C-0034 awarded by the U.S. Air Force to Lockheed Martin Corp. and the Government has certain rights in this invention.

FIELD OF THE INVENTION

The present invention generally relates to providing quick access to a closed area, and, in particular, to a frangible access panel which provides emergency or quick access to a host structure.

BACKGROUND OF THE INVENTION

Various systems have been developed over the years in the aerospace industry to provide access to an interior area of an aircraft or to an interior area of a payload fairing interconnected to a launch vehicle. One such system utilizes a number of traditional threaded fasteners such as NAS series bolts to mount an emergency access door onto a launch vehicle payload fairing or aircraft. The disadvantage of this system lies in the additional complexity and increased weight of the system, which is not desirable in aircraft and launch vehicle application. Use of traditional threaded fasteners also inhibits timely access to the interior area of the host structure due to the time and difficulty associated with de-mating a bolted access door. Another method for allowing access to the interior of a host structure is to simply cut an access hole through the wall of the host structure when such access is required. The disadvantage of this method is that it typically ruins the host structure (e.g., aircraft, payload fairing, etc.), which, in some cases, is worth several thousand or million dollars.

SUMMARY OF THE INVENTION

Accordingly, it is an object of the present invention to provide a system for providing an opening to an interior area of a host structure.

It is another object of the present invention to provide a system which allows the interior area of a host structure to be quickly and efficiently accessed, such as in emergency situations.

It is a further object of the present invention to provide a system which provides non-labor intensive access to the interior area of a host structure while minimizing damage to the host structure.

The present invention achieves one or more of these objectives by providing an access panel or door which is readily separable from the host structure (e.g., payload fairing, aircraft, spacecraft, sea vessel skins, bulkheads, barriers, etc.) interconnected thereto. Generally, in one aspect of the present invention, the access panel is initially interconnectable to the host structure via a separation system, the separation system including first and second interconnect members (e.g., doubler plates) and an explosive or detonation assembly position therebetween. The explosive assembly may include a detonation cord extending about at least a portion of the perimeter of the access panel. The system may further include a detonation initiator, which is adapted to supply energy to the detonation cord to thereby detonate the explosive assembly, which results in the separation of the first and second interconnect members, which, in turn, facilitates separation of the access panel from the host structure.

In one aspect, the separation system functions to facilitate lateral separation of the access panel relative to the longitudinally-extending host structure. In one embodiment, the first and second interconnect members include first and second notches or grooves, respectively, the first and second notches defining first and second break planes along which the first and second interconnect or structural members separate or break, respectively. In this embodiment, for purposes of allowing severed portions of the interconnect members to separate without substantial collision therebetween, the first and second notches are displaced or staggered relative to each other. In this regard, the first and second break planes of the first and second interconnect members, respectively, are different and non-coplanar.

In another aspect, the present invention is directed to providing a system for separating at least portions of a noncircular (e.g., three or more sides) access panel from a host structure to allow access to an interior area of the host structure. In one embodiment, where the access panel has first and second laterally spaced side walls and first and second longitudinally spaced end walls, the separation system includes first, second, third and fourth separation assembly sections which extend between and initially interconnect the side walls and end walls of the access panel and the corresponding portions of the host structure. Each separation assembly section includes first and second structural or interconnect members and a detonation cord enclosed in a detonation tube positionable between the first and second interconnect members. In this embodiment, the system further includes a detonation initiator for providing a charge or energy to the detonation cord, which results in detonation of the detonation cord. In instances where the detonation tube and cord enclosed therein do not extend around at least one comer defined by a side wall and an end wall of the access panel, the system may further include an ordnance transfer assembly, which functions to transfer the energy or charge from one portion of the detonation cord (e.g., within the first separation assembly section) to another portion of the detonation cord (e.g., within the second separation assembly section). Such ordnance assemblies are particularly useful in instances where it is technically difficult or cost prohibitive to bend the detonation tube and detonation cord contained therein around such a comer.

More specifically, the separation system may include first and second structural members (e.g., doublers or doubler plates) which at least initially interconnect the first and second structures, the first structural member being displaced from the second structural member, first and second notches or grooves positioned on the first and second structural members, and an explosive assembly, contained between the first and second structural members, for breaking the first and second structural members at first and second break planes defined by the first and second notches on the first and second structural members, respectively. Of importance, the first and second notches are displaced or staggered relative to one another (e.g., nonplanar), such that the first and second break planes of the first and second structural members, respectively, are offset or displaced relative to each other (e.g., nonplanar) to avoid undesirable contact therebetween. In addition, in order to enhance fracture of the first and second structural members, the first and second notches are positionable on the explosive-facing and/or non-explosive facing sides of the first and second structural members, depending upon the particular structural member on which the groove is positioned.

For purposes of facilitating separation of and otherwise avoiding undesirable contact or a substantial collision between the first and second structures upon separation, in one embodiment, the first notch on the first structural member is positionable along a first tangential plane defined by the explosive means, and the second notch on the second structural member is positionable such that the second notch is aligned with at least a portion of the explosive means. For example, the second notch on the second structural member may be aligned with a center portion of the explosive core of the explosive means, such that the second structural member will fracture or break as the explosive means expands to a circular configuration upon firing. In another embodiment, the staggered first and second notches on the first and second structural members, respectively, are both positionable along tangential planes defined by the explosive means. Such tangential planes may be defined by first and second portions of the explosive means (e.g., end portions of explosive means in an unexploded state). In this regard, the first and second displaced break planes defined by the first and second displaced notches on the first and second structural members, respectively, may be substantially coincident with the first and second tangential planes defined by the explosive means. In these embodiments of the separation system of the present invention, upon firing of the explosive means, the first and second structural members or doublers are fracturable or severable at the weak points of the first and second structural members (e.g., at the first and second displaced or staggered notches). Due to the displaced or staggered positioning of the first and second notches, a relatively damage-free separation of the first and second sections or structures is facilitated upon such firing of the explosive means since adverse contact between the severed portions of the first and second structural members is minimized.

Such a separation system is especially useful in instances where separation of the first structure relative to the second structure is required. In this regard, the present invention allows the first structure to separate relative to the second structure without the severed portions of the first and second structural members adversely colliding with each other or with the explosive means in an exploded state or otherwise damaging each other after the explosive means is fired to cause severance in the first and second structural members. For example, in instances where a vehicle having a first structure (e.g., payload fairing, door, window, canopy, spacecraft, etc.) and a second structure (e.g., core launch vehicle, land-based vehicle, air-based vehicle or sea-based vehicle) is moving in a first direction (e.g., along a longitudinal axis of the vehicle or the direction of movement of the vehicle), separation in at least a second direction (e.g., at least laterally, relative to the longitudinal axis of the vehicle or at least orthogonally relative to the direction of the vehicle) of the first structure relative to the second structure may result by utilizing the separation system of the present invention, without adversely contacting the second structure, such that the first structure is free to separate (e.g., be ejected) from the second structure. In this regard, the first structure may separate at least in a second direction (e.g., at least laterally) relative to the second structure moving in at least the first direction (e.g., along the vehicle's longitudinal axis) without the severed portions of the first and second structural members adversely colliding with or otherwise getting hung up on each other or with the expanded explosive container. The present invention thus not only provides for separation of the first and second structures by breaking the first and second structural members upon firing of the explosive means, but also reduces the likelihood of undesirable contact by providing at least the displaced or staggered first and second notches, which facilitate severance of the first and second structural members at first and second break planes, the first break plane being offset or displaced from the second break plane.

In summary, for purposes of enhancing severance of the structural members or doublers and separation of the first and second structures relative to each other, the first groove is positionable on one of first and second surfaces (e.g., explosive-facing and nonexplosive-facing sides) of the first structural member, on a first portion of the first structural member to define a line of fracture through the first structural member, and the second groove is positionable on one of the first and second surfaces (e.g., explosive-facing and nonexplosive-facing sides) of the second structural member, on a second portion of the second structural member to define a second line of fracture through the second structural member. The first portion of the first structural member is offset or displaced along the first direction from the second portion of the second structural member. In this regard, a relatively damage-free separation at least in the second direction of the first structure relative to the second structure is thus facilitated as the first and second staggered grooves are positionable in the first and second portions of the first and second structural members, respectively.

In another aspect of the present invention, in order to further enhance the opportunity for a relatively collision free separation between first and second structures and to reduce forces required to fracture and bend the structural members to facilitate such separation, the first and second structural members (e.g., doubler plates) may be configured or affected to bend about or hinge in a selected area. In this regard, bending of the first and second structural members upon firing of the explosive means may be enhanced and controlled, to a certain degree, by providing bend augmentation means. In one embodiment, the bend augmentation means comprises a reinforced portion on at least one of the first and second structural members or doublers to facilitate bending of the first and second structural members about selected portions thereof while facilitating the fracture of the first and second structural members at, for example, the first and second staggered notches, respectively. In this regard, such reinforced portions of the first and/or second structural members have a thickness greater than the thickness of the first and/or second structural members at the first and second staggered grooves. Such reinforced portions may comprise a thickened portion of the doubler and/or a separate doubler plate or stiffening member interconnected to the first and/or second structural member. In another embodiment, the bend augmentation means comprises at least a first bend augmentation relief portion on at least one of the first and second structural members. Such bend augmentation relief portion facilitates bending or hinging of one of the first and second structural members, about or in the relief portion, when the explosive means is fired to fracture at least one of the first and second structural members at a portion thereof displaced from the bend augmentation relief portion. In this regard, the relief portion(s) define(s) a thickness in the first and/or second structural members which is less than that of the first and/or second structural members in other portions. Such relief portions may be positioned in upper or lower portions of the structural members, on nonexplosive-facing surfaces of the structural members to further facilitate bending of the structural members away from the explosive means upon firing of the explosive means. In instances where the first and/or second structural members have weakened sections or grooves to facilitate severance of the first and/or second structural members along lines of fracture defined by such grooves and also include one or more relief portions to facilitate bending of the first and/or second structural members upon detonation of the explosive means, the thickness of the structural members at the relief portions is greater than the thickness of the structural members at the grooves. In this regard, the structural members will predictably fracture at the grooves and bend in the relief portions to thus allow the first section to separate from and relative to the second section.

In another embodiment, the separation system further includes a slide plane means interconnected to at least the first structural member. Of importance, the slide plane means functions to at least initially guide one of the first and second sections away from and relative to the other of the first and second sections after at least the first structural member has been severed by firing of the explosive means. In this regard, the slide plane means facilitates a relatively collision-free separation of the first section relative to the second section as the slide plane means guides one of the first and second sections away from the other of the first and second sections along a predetermined plane or path defined by the slide plane means. In this embodiment, the slide plane means includes at least a first slide member interconnectable to one of the first and second sections. For purposes of inhibiting damaging contact between severed portions of the first and second structural members after firing of the explosive means, the slide plane means is alignable or coplanar with one of the first and second staggered grooves. Further, for purposes of at least initially guiding the first section away from the second section such that severed portions of at least one of first and second structural members which initially interconnected the first and second sections do not adversely contact each other, the first slide member is orientable between about 1° and about 90° relative to at least one of the first and second structural members. For example, in instances where a vehicle having a first section (e.g., payload fairing, payload, door, window, canopy, spacecraft, etc.) and a second section (e.g., core launch vehicle, land-based vehicle, air-based vehicle or sea-based vehicle) is moving in a first direction (e.g., along a longitudinal axis of the vehicle), separation in at least a second direction (e.g., at least laterally, relative to the longitudinal axis of the vehicle) of the first section relative to the second section may result by utilizing at least the first slide member of the separation system of the present invention, without substantially damaging the first or second sections. More particularly, in instances where the vehicle is moving in a first direction (e.g., in a direction along a longitudinal axis of the vehicle), a first slide member angled between about 1° and about 90° relative to the first direction at least initially guides the first section away from the second section, at least partially in a second direction, to inhibit undesirable contact between the severed portions of the first and second structural members. The present invention thus not only provides for separation of the first and second structures, but also reduces the likelihood of substantial damage from collisions by providing at least the first slide member to guide the first section away from the second section.

In another embodiment, the slide plane means includes first and second opposing slide members or pads for guiding the first section away from the second section after severance of the first and second structural members by firing of the explosive means. In this embodiment, the first and second slide members define a slide plane which is alignable or substantially coplanar with the first groove on the first structural member, which is coplanar with a first tangential plane defined by a first end portion of the explosive means in an unexploded state. In particular, the first and second pads are interconnectable to the first and second sections, respectively, and are capable of slidably engaging one another. In this regard, after firing of the explosive means to sever at least one of the first and second structural members, the first and second pads function to at least initially guide the first section away from the second section along at least a first separation plane defined by the first and second pads. For example, in instances where it is desirable to have the first section separate at least laterally relative to a longitudinally moving second section, the first and second pads may be oriented between about 1° and about 90° relative to at least one of the first and second sections or relative to at least one of the first and second structural members. In one embodiment, the first and second pads are oriented about 90° relative to at least one of the first and second structural members to facilitate movement of the first section away from the second section, in a direction, at least initially, perpendicular to at least one of the first and second structural members. To further enhance such guided separation, a low friction coating may be applied to at least one of the first and second pads.

BRIEF DESCRIPTION OF THE DRAWINGS

FIGS. 2A–2C illustrate cross-sectional progressive views of one embodiment of the separation system of the present invention;

FIGS. 3A–3C illustrate cross-sectional progressive views of another embodiment of the separation system of the present invention;

FIGS. 4A–4D illustrate cross-sectional progressive views of still another embodiment of the separation system of the present invention;

FIGS. 5A–5C illustrate cross-sectional progressive views of still another embodiment of the separation system of the present invention;

FIGS. 8A–8C illustrate cross-sectional progressive views of another embodiment of the separation system of the present invention;

FIGS. 9A–9C illustrate cross-sectional progressive views of another embodiment of the separation system of the present invention;

FIGS. 10A–10C illustrate cross-sectional progressive views of another embodiment of the separation system of the present invention;

DETAILED DESCRIPTION OF THE INVENTION

Figure 1:
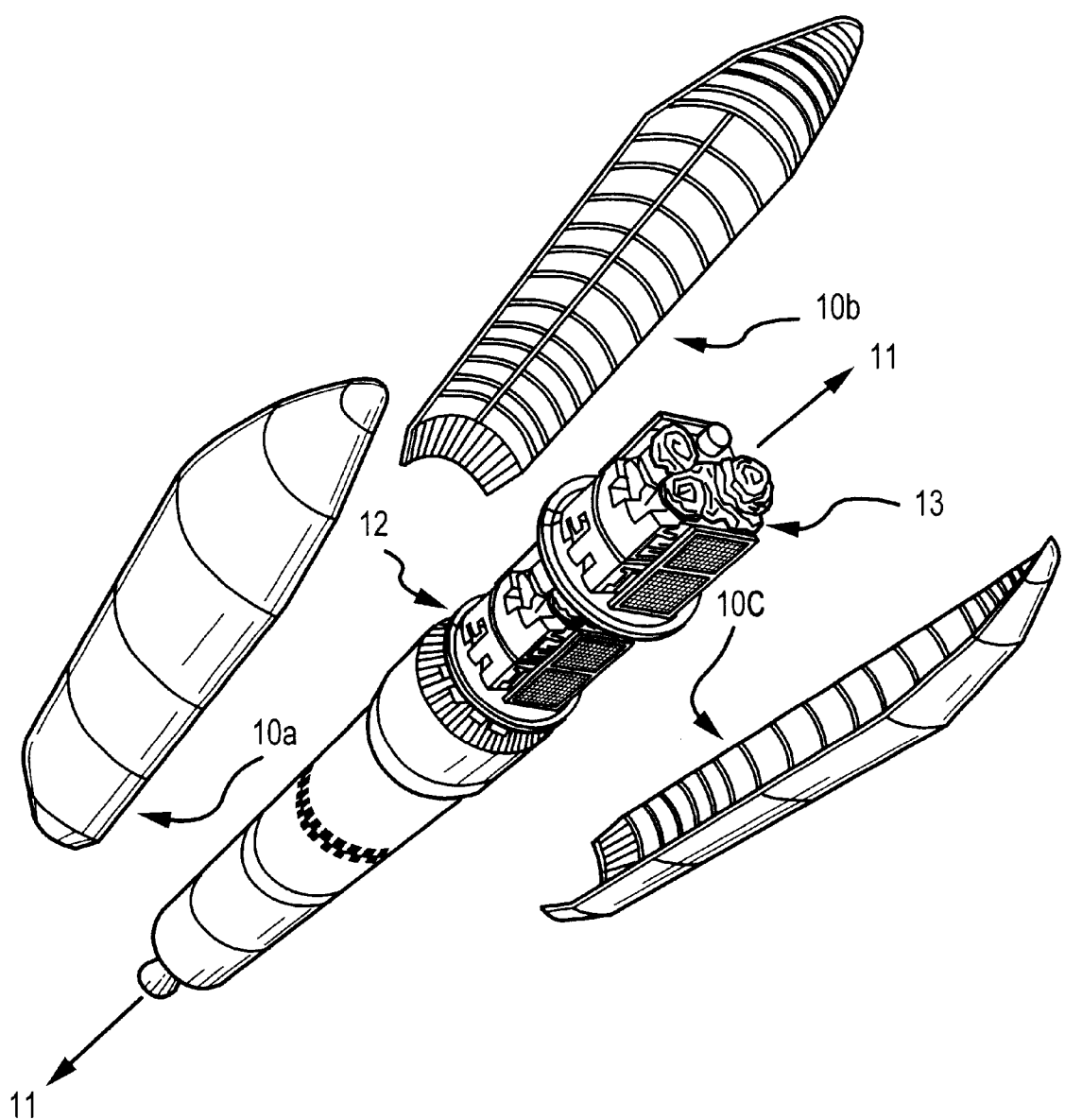
FIG. 1 illustrates a perspective view of lateral separation of tri-sector payload fairings from a launch vehicle utilizing the separation system of the present invention.

FIGS. 1–11 illustrate various features of the separation system of the present invention. Generally, the separation system of the present invention may be used to at least initially interconnect first and second structures or sections, and thereafter to separate the first structure from the second structure. Such separation allows other devices, such as conventional ordnance devices, thrusters, or spring-like devices, to be used to forcibly eject the first structure relative to the second structure. In this regard, the separation system of the present invention may be used in a variety of applications, including, but not limited to, at least lateral separation of tri-sector payload fairings 10a, 10b, 10c from the longitudinally extending core launch vehicle 12, the core launch vehicle traveling along its longitudinal axis 11, as illustrated in FIG. 1. Of course, the separation system of the present invention can also be used to at least laterally separate bi-sector payload fairings from a core launch vehicle (not shown). Further, while the embodiments of the separation system illustrated and described herein are primarily directed to at least laterally separating structures oriented at least longitudinally, the separation systems disclosed herein may be utilized for at least longitudinally separating structures which are at least laterally oriented.

In one embodiment of the system of the present invention, illustrated in FIGS. 2A–2C, the separation system 20 includes first and second structural members or doublers 26, 30, an expanding tube explosive charge system having an explosive 36 contained between the first and second doublers 26, 30, and first and second grooves 40, 44 positioned on the first and second doublers 26, 30, respectively. The first and second doublers 26, 30 are interconnected to first and second sections or structures 48, 52, which may correspond to, for example, a payload fairing and the core of a launch vehicle, respectively. In this regard, the separation system 20 at least initially interconnects the first and second sections 48, 52, and then functions to separate the first section 48 relative to the second section 52 by breaking or fracturing the first and second doublers 26, 30, as will be described in more detail hereinbelow.

In particular, and referring to FIG. 2A, first and second sections 48, 52 to be separated are at least initially interconnected to each other by the separation system 20 of the present invention. In this regard, first and second doublers 26, 30 of the present invention extend between and are interconnected to the first and second sections 48, 52 to be separated. Such interconnection may be accomplished via mechanical fasteners, such as bolts 56a, 56b, which extend through bores in the first and second doublers 26, 30 and through bores in the first and second sections 48, 52 respectively. End portions 49, 53 of the first and second sections 48, 52 and inner walls 27, 31, of the first and second doublers 26, 30 define a cavity or space therebetween for containing an explosive charge 36. Such explosive 36 (e.g., single or dual cord) may be contained within an elastomer 37, both of which are contained in an expandable metal tube 38. The expandable tube 38, which is interconnected to the second section 52 via a restraining strap 55 provides a contamination free separation of the first section 48 relative to the second section 52 when the explosive 36 is fired or detonated by containing the products of such detonation. In this regard, detonation of the explosive 36 results in inflation and expansion of the tube 38 to a generally circular configuration. Such expansion of the tube 38 breaks or fractures the first and second doubles 26, 30 which are in shear and/or tension at the first and second grooves or notches 40, 44, as will be explained in more detail hereinbelow. For purposes of absorbing shock forces generated by detonation of the explosive 36, a shock absorbing tape 35 fabricated, for example, from silicon rubber, may be interposed between the end portions 39a, 39b of the tube 38 and the end portions 49, 53 of the first and second sections 48, 52.

In one embodiment, illustrated in FIG. 2A, for purposes of facilitating at least lateral separation of the first longitudinally extending section 48 relative to the second longitudinally extending section 52, first and second grooves 40, 44 are positioned on outer walls 28, 32 of the first and second doublers 26, 30, respectively. The first and second grooves 40, 44 provide weak points in the first and second doublers 26, 30, to thereby define break or fracture planes along which the first and second doublers 40, 44 will fracture upon detonation of the explosive 36. In this embodiment, illustrated in FIG. 2A, the first groove 40 on the first doubler 26 is staggered relative to the second groove 44 on the second doubler 30. In this regard, the first and second grooves 40, 44 are not coplanar with each other (e.g., offset). Rather, in this embodiment, the first and second grooves or notches 40, 44 are positioned on the first and second doublers 26, 30 respectively, along tangential planes defined by end portions 39a, 39b of the unexpanded tube 38 containing the explosive 36. Specifically, the first groove 40 on the first doubler 26 is aligned with the tangential plane defined by a first end portion 39a of the unexpanded tube 38 while the second groove 44 is aligned with a second end portion 39b of the tube 38. Such positioning of the first and second grooves 40, 44 facilitates a relatively damage-free separation of the first section 48 relative to the second section 52, since expansion of the tube 38 at detonation of the explosive 36 causes the first and second doublers 26, 30 to break and bend away from the tube 38 in such a way so as to permit the first section 48 to at least laterally move over the top of the expanded tube 38 and the severed portions 29a, 33a of the first and second doublers 26, 30, as illustrated in FIGS. 2B–2C.

FIG. 2B shows the separation system 20 of FIG. 2A after the explosive 36 has been detonated. Firing of the explosive 36 causes the tube 38 to expand to a substantially circular cross-section as a result of expanding gaseous detonation products. Such expansion of the tube 38 deforms portions of the first and second doublers 26, 40, as illustrated in FIG. 2B, and fractures or ruptures the weakened sections of the first and second doublers 26, 30 at the first and second grooves 40, 44. Since the elastomer 37 absorbs much of the shock from the explosive 36, the principle force causing expansion of the tube 38 is the high pressure forces generated within the tube 38 by the gaseous products of the explosion. Detonation or firing of the explosive 36 may be accomplished electrically via control circuitry (not shown).

As illustrated in FIG. 2B, the first and second sections 48, 52 are separable after firing of the explosive 36. In this regard, the first section 48 is movable relative to the second section 52. In one embodiment, where at least lateral separation relative to longitudinally extending doublers 26, 30 is desired, the separation system 20 of a present invention is particularly useful in avoiding undesirable contact between the first and second sections 48, 52 and/or adverse contact between the sections 48, 52 and the expanded tube 38, especially in instances where at least lateral separation of the first section 48 relative to a longitudinally moving second section 52 is desired. In this regard, the selected positions of first and second grooves 40, 44 on the first and second doublers 26, 30, respectively, facilitate such separation as the resulting fractured end portions of 29a, 29b, 33a, 33b of the first and second doublers 26, 30, respectively, are not likely to adversely collide with each other or with the expanded metal tube 38, which remains interconnected to the second section 52 after detonation of the explosive 36 via the restraining strap 55. In this regard, the first section 48 is free to at least laterally separate from and relative to the second section 52, as illustrated in FIG. 2C. Such lateral separation may be accomplished by an ejection means (not shown), which functions to push or force the first section 48 laterally away from and relative to the second section 52.

In another embodiment, illustrated in FIGS. 3A–3C, for purposes of maximizing the fracturing forces generated by detonation of the explosive 136 and expansion of the tube 138 while facilitating a relatively collision-free separation of the first and second structural members or doublers 126, 130, the first and second grooves 140, 144 are staggered (nonplanar) relative to each other and are further positionable on the explosive-facing and nonexplosive-facing sides 127, 132 of the first and second structural members 126, 130, respectively. In this embodiment, the second groove 144 is positionable proximate a center portion of the expandable tube 138 and/or the explosive 136, as opposed to along a tangential plane defined by an end portion of the explosive means. In this regard, the second structural member 130 will fracture substantially in tension due to bending when the tube 138 expands upon firing of the explosive 136 to a circular cross-section, as illustrated in FIG. 3B. In addition, in order to enhance the likelihood for a collision-free separation of the first section 148 relative to the second section 152, the first groove 140 is positionable on the first structural member 126 along a tangential plane defined by an end portion 139a of the expandable tube 138 containing the explosive 136 (in an unexploded state). Such positioning of the staggered grooves 140, 144 also enhances the fracturability of the first and second structural members 126, 130 and reduces shock since less force is required to break the doublers 126, 130. In particular, locating the second groove 144 on the nonexplosive-facing side 132 of the second structural member 130 proximate a center portion of the explosive system shifts the stress concentration to the area of tension load due to bending to facilitate fracturing of the second structural member 130. In this regard, the second doubler 130 will break or fracture in tension upon firing of the explosive 136 and the resulting expansion of the tube 138. Furthermore, locating the first groove 140 along a tangential plane defined by the unexpanded tube 138 provides for the fracture of the first doubler 126 along a break plane above the expanded tube 138 (e.g., after firing of explosive 136), which facilitates a relatively damage-free separation of the first and second sections 148, 152. Once the doublers 126, 130 are fractured and deformed, the first section 148 is substantially free to separate relative to the second section 152, as illustrated in FIGS. 3B–C. As such, this staggered arrangement of the grooves 140, 144 reduces the likelihood of application of undesirable forces between the severed sections 129a, 129b, and 133a, 133b of the first and second structural members 126, 130 with each other and/or with the expanded tube 138.

In yet another embodiment of the present invention, illustrated in FIGS. 4A–4C, the separation system 220 of the present invention includes first and second structural members or doublers 226, 230 interconnecting first and second sections 248, 252 to be separated, first and second grooves 240, 244 positioned on explosive-facing and nonexplosive-facing surfaces 227, 232 of the first and second doublers 226, 230, respectively, a single explosive charge 236 contained within an expandable tube 238 which is positioned between the first and second doublers 226, 230 and between the first and second sections to be separated 248, 252, and a slide plane means defined by first and second slide members 260, 264 interconnectable to the first and second sections 248, 252 for facilitating a relatively collision-free separation of the first section 248 relative to the second section 252. More specifically, for purposes of breaking the first and second doublers 226, 230 along break planes to permit a relatively collision-free lateral separation of the first section 248 relative to the second section 252, the first and second grooves 240, 244 are positioned on the inner and outer walls 227, 232 of the first and second doublers 226, 230, respectively. Positioning of the first and second grooves 240, 244 on the explosive-facing and nonexplosive-facing walls 227, 232 of the first and second doublers 226, 230, respectively, results in areas of tension load due to bending, which facilitates fracturing of the doublers 226, 230. Further, the first and second grooves 240, 244 are staggered. In this regard, the first notch or groove 240 is positioned in substantial alignment with a tangential plane defined by end portion 239a of the expandable tube 238 enclosing the unexploded charge 136. The second notch or groove 244 is positioned proximate a central portion of the expandable tube 238, in a center portion of the doubler 230, such that the second doubler 230 will break in a central section of the second doubler 230, when the tube 238 expands to a circular configuration upon firing of the explosive 236. Such positioning of the first and second grooves 240, 244 results in severance or fracture of the first and second doublers 226, 230. In this regard, the first and second grooves 240, 244 are displaced or staggered relative to one another to facilitate fracture or severance of the first and second doublers 226, 230 at the first and second grooves 240, 244, as the first and second grooves 240, 244 define weakened areas of the first and second doublers 226, 230, respectively. As such, firing or detonation of the explosive charge 236 causes the tube 238 to expand to bend and break the first and second doublers 226, 230, such that the first section 248 is movable laterally over the tube 238, which is restrained in a conventional manner to the second section 252, as illustrated in FIG. 4B. Severance or fracture of the first and second doublers 226, 230 at the first and second grooves 240, 244 allows a substantially collision-free separation of the first section 248 relative to the second section 252 as the fractured ends 229a, 229b of the first doubler 226 and the fractured portions 233a, 233b of the second doubler 230 can clear each other.

Figure 4D:
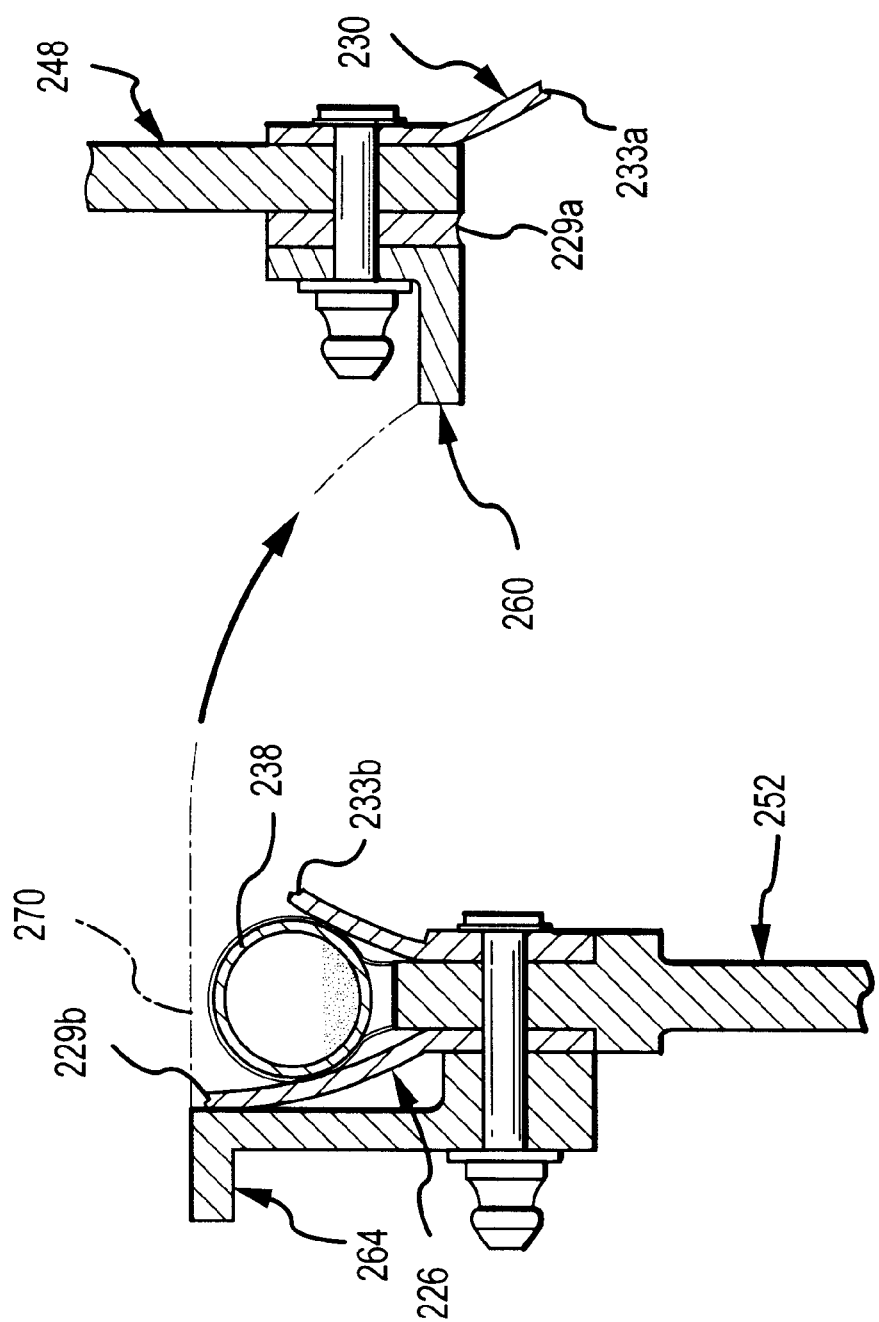

Referring to FIGS. 4A–4C, a relatively damage-free lateral separation of the first section 248 relative to the second section 252 is further facilitated by the slidable engagement of the first slide member 260 relative to the second slide member 264, the first and second slide members 260, 264 being interconnected to the first and second sections 248, 252 to be separated and defining a slide plane 270 along which, at least initially, the first section 248 may move relative to the second section 252. In particular, after the first and second doublers 226, 230 are severed by detonation of the explosive 236, the first section 248 may be moved (e.g., ejected) relative to the second section 252. For purposes of facilitating at least, for example, lateral separation of the first section 248 relative to the second section 252, the first and second slide members 260, 264 and specifically, the surfaces 261, 265 of the first and second slide members 260, 264, are oriented at least laterally (e.g., 90°) relative to the longitudinally extending first and second doublers 226, 230. As such, these first and second slide members 260, 264 facilitate a substantially damage-free separation by at least initially inhibiting downward longitudinal movement of the first section 248 relative to the second section 252, at least until the first section 248 has cleared the second section 252, as illustrated in FIGS. 4B–4C. In this regard, the first and second slide members 260, 264 at least initially inhibit undesirable contact of the first section 248 with the exploded metal tube 238 and the second section 252, as illustrated in FIG. 4C. Once at least laterally cleared from the second section 252, the first section is free to move longitudinally downwardly relative to the longitudinally extending and moving second section 252, as illustrated in FIG. 4D.

In particular, the first and second surfaces 261,.265 of the first and second slide members 260, 264, respectively, are load bearing surfaces which are slidably engagable with each other, at least initially, to enable the first section 248 to laterally slide relative to and away from the second section 252. In this embodiment, illustrated in FIGS. 4A–4C, the first and second slide members 260, 264 are oriented substantially perpendicular to the longitudinally extending first and second doublers 226, 230 and relative to the first and second sections 248, 252 to be separated relative to each other. Further, for purposes of enhancing a relatively damage-free lateral separation of the first section 248 relative to the second section 252, the slide plane 270 defined by the first and second slide members 260, 264 is substantially aligned or coplanar with the first groove 240 on the first doubler 226, which defines a break plane for the first doubler 226. Such alignment of the slide plane 270 with the first groove 240 enhances separation and ejection of the first section 248 relative to the second section 252 by substantially inhibiting undesirable contact between the severed portions 229a, 229b of the first doubler 226. In an alternative embodiment (not shown), the slide plane may be defined by first and second slide members on the opposite (e.g., outboard) side of the first and second doublers and may be aligned with the second groove 244.

In this regard, collision-free lateral separation and ejection of the first section 248 relative to the second section 252 is possible, even in instances where the second section 252 continues to move in a direction parallel to a longitudinal axis of the second section 252, since the separation system 220 facilitates separation and ejection of the first section 248 in a direction at least orthogonal to the direction of movement of the second section 252. As such, the separation system 220 of the present invention is especially useful for laterally separating a first section 248 relative to a second section 252, even in instances where the second section 252 (e.g., core launch vehicle) is moving in a direction parallel to a longitudinal axis of the second section 252 to thus facilitate a collision-free separation of first section 248 relative to the second section 252.

For purposes of facilitating proper lateral ejection, at least one of the load bearing surfaces 261, 265 of the slide members 260, 264, respectively, can be coated with a low friction material. In this embodiment, illustrated in FIG. 4A–4C, the surface 265 of the first slide member 264 includes a lubricant or low friction coating 262, such as a dry film, molybdenum disulfide lubricant. Further, orientation and length of the first and second slide members 260, 264, may be varied, depending upon, for example, the orientation of the first and second doublers 226, 230 relative to the desired direction of separation (e.g., orthogonally) of the first section 248 from the second section 252, and the predicted or intended break planes of the doublers 226, 230. For example, the slide plane 270 may be substantially coplanar with at least one of the fracture or break planes in the first and second doublers 226, 230, to guide the first section 248 away from the second section 252, which thereby inhibits undesirable contact between the separated structures, as illustrated in FIG. 4B–4C. More specifically, the slide plane 270 defined by the first and second slide plane members 260, 264 may be positioned in substantial alignment with at least one of the break planes of the first and second doublers 226, 230 to at least initially inhibit downward longitudinal movement of the first section 248 relative to the second section 252 and specifically, to inhibit damaging contact between severed end portions 229a, 229b, 233a, 233b with each other and with the expanded tube 238. In this regard, the positioning of the staggered grooves 240, 244 and the slide plane means function to inhibit adverse contact between the severed portions of the first and second doublers 226, 230 with each other and with the expanded tube 238.

As illustrated in the above-described embodiments of the separation system, the first and second grooves on the first and second structural members or doublers may be staggered relative to each other to avoid undesirable contact between the separated portions. In addition, such separation systems may further include a slide plane means to further inhibit adverse contact between the separated sections. In another embodiment, a separation system which achieves a substantially damage-free separation while utilizing coplanar grooves on the first and second structural members is disclosed. In this embodiment, illustrated in FIGS. 5A–5C, the separation system includes a slide plane means which is coplanar with first and second opposing grooves on the first and second doublers, respectively. In view of such, the slide members which define the slide plane can be positioned and sized to at least initially inhibit collisions upon severance of the first and second doublers. Referring to FIGS. 5A–5C, in this embodiment of separation system, the system 320 includes first and second doublers 326, 330 for interconnecting, at least initially, first and second sections 348, 352 to be separated, an explosive charge 336 contained therebetween, coplanar first and second grooves 340, 344 positioned on the first and second doublers 326, 330 and first and second slide members 360, 364, which are aligned with the coplanar first and second grooves 340, 344 on first and second doublers 326, 330. The first and second grooves 340, 344 are positioned proximate a tangential plane defined by a first end portion 339a of the expandable tube 338 in an unexploded state. Further, for purposes of facilitating fracture of the first and second doublers 326, 330, the first and second grooves 340, 344 are positionable on explosive facing surfaces 327, 331 of the first and second doublers 326, 330. In order to achieve, for example, at least lateral separation of the first section 348 relative to the second section 352 while avoiding adverse contact between the severed portions 329a, 333a of the first and second doublers 326, 330 with the expanded tube 338 and/or with the severed end portion 333b of the second doubler 330, the first and second slide members 360, 364 can be positioned in substantial alignment with the first and second grooves 340, 344. In this regard, upon separation, the first section 348 is movable relative to the second section 353 along the slide plane 370 defined by the first and second slide members 360, 364, which substantially coincides with the line of fracture through the first and second doublers 326, 330. As such, the slide plane members 360, 364 function to at least initially inhibit downward movement of the first section 348 relative to the second section 352 to avoid damaging contact between the severed end portions 329a, 329b, 333a, 333b with each other and with the expanded tube 338. Further, the first and second slide members 360, 364 can be sized (e.g., in length) to be slidably engagable with one another to at least initially inhibit downward movement of the first section 348 relative to the second section 352, at least until an ejection system (not shown) operates to forcibly eject the separated first section 348 away from the second section 352.

Figure 6:
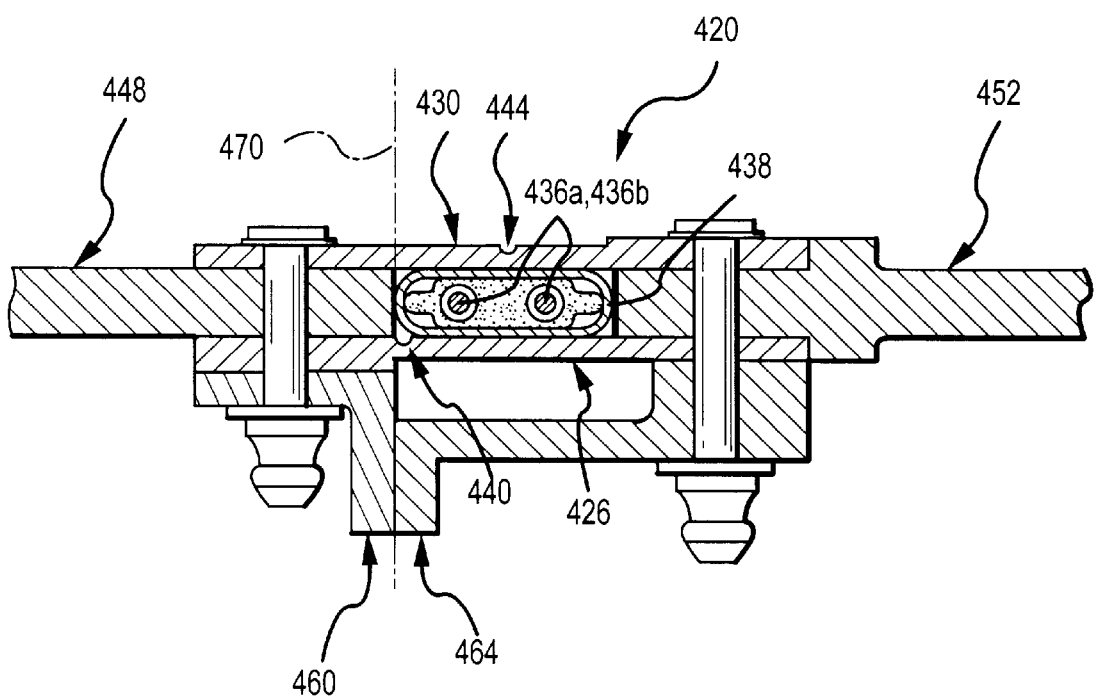
FIG. 6 illustrates a cross-sectional view of another embodiment of the separation system of the present invention for use, for example, in at least longitudinally separating a first section relative to a second section, which can be moving and/or oriented laterally.

FIG. 6 illustrates another embodiment and application of the separation system of the present invention. In this embodiment, the separation system 420 is used to at least longitudinally separate a first section (e.g., door) 448 from a second section (e.g., at least laterally moving vehicle) 452. Alternatively, the separation system may be used to separate the payload 13 illustrated in FIG. 1 from the longitudinally extending and moving core launch vehicle 12. Referring to FIG. 6, the separation system 420 includes first and second doublers 426, 430 for at least initially interconnecting the first and second sections 448, 452, a dual cord explosive system having two explosive charges 436a, 436b enclosed in an inflatable tube 438 for severing or breaking the first and second doublers 426, 430 upon detonation, and staggered, non-coplanar first and second grooves 426, 430 positioned on the first and second doublers 426, 430. As noted hereinabove with regard to other embodiments, the first and second grooves 440, 444 may be aligned with tangential planes of the tube 438 containing the explosive charge 436 to facilitate a collision-free separation and ejection of the first section 448 relative to the second section 452. In this embodiment, the first and second grooves 440, 444 on the first and second laterally extending doublers 426, 430, respectively, are staggered (e.g., not coplanar relative to one another). The first and second grooves 440, 444 define weak areas (e.g., break planes) of the first and second doublers 426, 430, which will thus break along break planes defined by the grooves 440, 444 when the explosive 436 is detonated. To further facilitate a collision-free longitudinal separation and ejection, the separation system 420 also includes a slide plane 470 defined by first and second slide members 460, 464, along which the first section 448 may be slidably moved longitudinally relative to the second section 452 in a collision-free manner during ejection of the first section 448. In this regard, the slide members 460, 464 inhibit lateral movement of the first section 448 relative the second section 452 during ejection of the first section 448. Of course, a single cord explosive may be utilized instead of the dual cord explosive illustrated in FIG. 6.

Figure 7C:
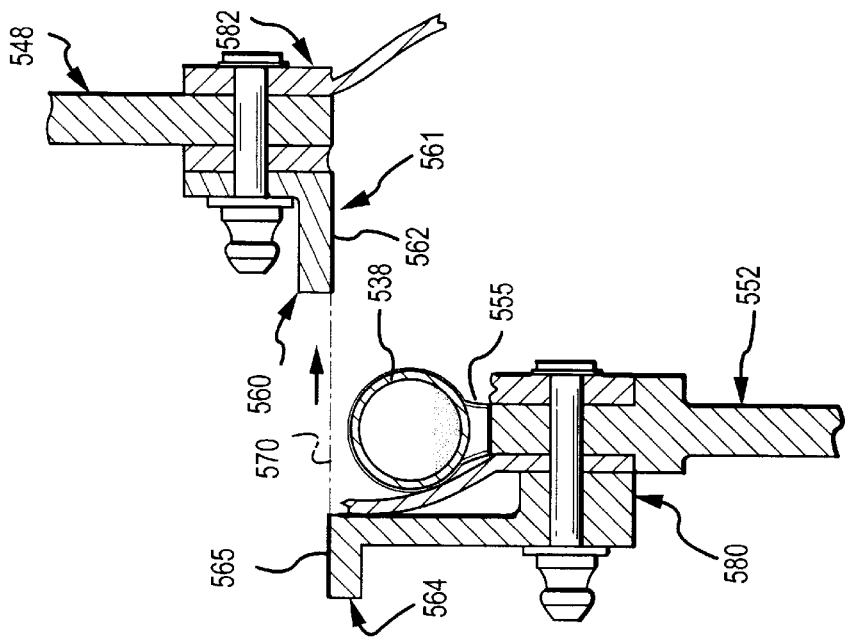
FIGS. 7A–7C illustrate cross-sectional progressive views of another embodiment of the separation system of the present invention.
Figure 7B:
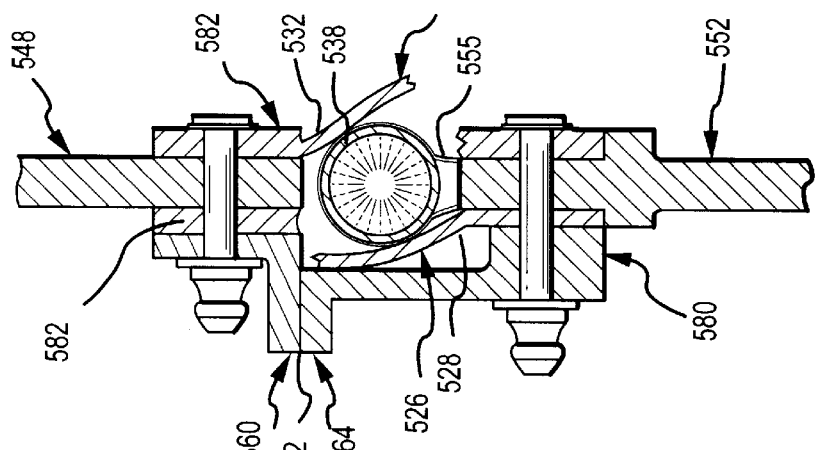
Figure 7A:
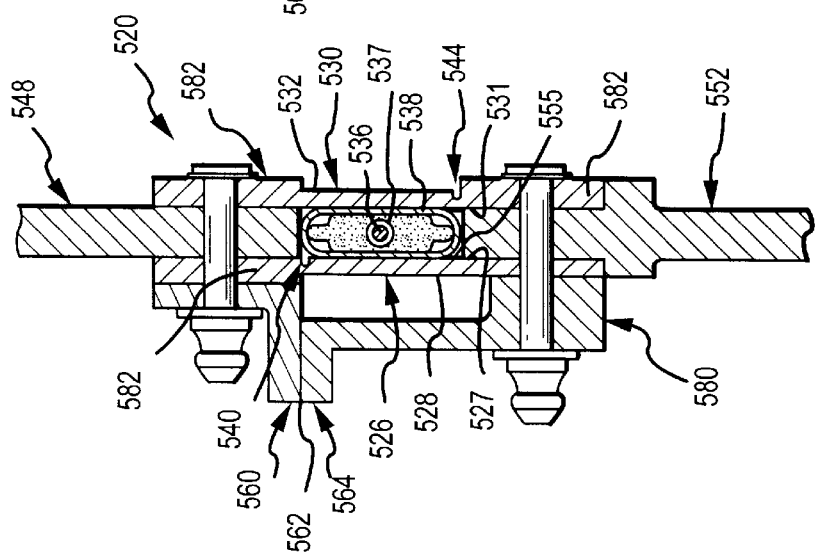

In another aspect of the present invention, illustrated in FIGS. 7A–7C, a separation system for separating a first section from a second section is provided. Referring to FIG. 7A, the separation system 520 includes first and second doublers 526, 530 extending between and interconnecting the first and second sections 548, 552. The system 520 further includes an explosive 536 enclosed within an elastomer 537, both of which are contained within an expandable (e.g., inflatable) metal tube 538. The explosive 536, the elastometer 537 and expandable metal tube 538 are positioned within a cavity defined by the inner (e.g., explosive-facing) walls 527, 531 of the first and second doublers 526, 530, respectively, the tube 538 being interconnected to the second section 552 via a stainless steel strap 555 wrapped therearound. The separation system 520 further includes a slide plane means having first and second slide members 560, 564, which define a slide plane. The first and second slide members 560, 564, are interconnectable to the first and second sections 548, 552, respectively. As such, upon firing of the explosive charge 536, which expands the tube 538, the first and second doublers 526, 530 are severed or fractured, as illustrated in FIG. 7B, which enables the first section 548 to be separated from and relative to the second section 552. The first and second slide members 560, 564 are slidably engagable with one another during separation and ejection of the first section 548 relative to the second section 552 to substantially inhibit significant downward longitudinal movement of the first section 548 relative to the second section 552, which is especially beneficial in instances where the second section 552 continues to move longitudinally upward. In this regard, collision of the first section 548 and the second section 552 upon severance of the first and second doublers 526, 530 may be inhibited.

In order to further reduce the possibility of an adverse collision, the separation system may further include bend augmentation means associated with (e.g., interconnectable to, integrally formed in or on) first and second structural members 526, 530, respectively, for facilitating bending or hinging of the first and second structural members 526, 530, as illustrated in FIGS. 7A–7C. In this embodiment, bend augmentation means define reinforced or stiffened portions 580, 582 which enhance bending or hinging of the first and second structural members 526, 530 in selected portions, such that upon firing of the explosive 536, the expanding tube 538 will cause the first and second structural members 526, 530 to rotate about or proximate the reinforced portions 580, 582, respectively, and break at first and second staggered notches 540, 544 on the first and second structural members 526, 530, respectively, displaced from the augmentation means 580, 582. In this regard, the bend augmentation means or reinforced portions can be a separate piece 580 (e.g., doubler plate, slide plane components, etc.) of stiffening material (e.g., metal, such as titanium, aluminum, stainless steel, or combinations and/or composites thereof) interconnected to the first structural member 526, as illustrated in FIG. 7A. Alternatively, the bend augmentation means or reinforced portion can be a thickened portion of the structural member or doubler. In this embodiment, the reinforced portion comprises a thickened portion 582 of the second structural member 530, the thickened portion 582 being integrally formed with the second structural member 530 to provide one or more thickened, less fracturable portions of the second structural member 530, as illustrated in FIG. 7A. Such thickened portion 582 has a thickness greater than that of the doublers 526, 530 themselves, and greater than thickness of the doublers 526, 530 at the first and second grooves 540, 544, respectively. In this regard, the doublers 526, 530 will fracture or sever at the first and second grooves 540, 544, respectively, and bend proximate the reinforced areas 580, 582.

FIGS. 8A–8C illustrate another embodiment of the separation system of the present invention. In this embodiment, the separation system 620 includes first and second doublers 626, 630 for interconnecting, at least initially, first and second sections 648, 652 to be separated, and explosive 636 contained within an expandable metal tube 638, the explosive 636 and tube 638 being contained within a cavity defined by the first and second doublers 626, 630 and first and second sections 648, 652. In addition, the separation system 620 includes first and second grooves 640, 644 which define lines of fracture in the first and second structural members 626, 630, respectively, the first and second structural members 626, 630 fracturable upon detonation of the explosive 636 and resulting expansion of the tube 638 to a circular cross-section. For purposes of facilitating such fracture and to reduce the amount of explosive required to bend the first and second structural member 626, 630 upon expansion of the tube 638, the separation system 620 further includes bend augmentation means. In this embodiment, the bend augmentation means comprises relief portions 690, 692 on the first and second structural members 626, 630, respectively. Alternatively, the bend augmentation means comprises reinforced portions, which are described hereinabove.

As illustrated in FIG. 8A, for purposes of facilitating a relatively collision-free separation of the first section 648 relative to the second section 652, the first and second grooves 640, 644 on the first and second doublers 626, 630 of the separation system 620 are staggered relative to each other. In this embodiment, the first and second grooves 640, 644 are positioned along first and second tangential planes defined by first and second end portions 639a, 639b of the tube 638 in an unexpanded state. In order to enhance the bendability of these doublers 626, 630 upon firing of the explosive 636 and resulting fracture of the doublers 626, 630, the relief portions 690, 692 on the first and second doublers 626, 630, respectively, are displaced from the grooves 640, 644, respectively. In this embodiment of the separation system, the relief portions 690, 692 on the first and second doublers 626, 630 are also staggered relative to each other. In particular, for purposes of enhancing the bendability of the doublers 626, 630 upon detonation of the explosive 636, the relief portions 690, 692 are positionable proximate the second and first tangential planes defined by the second and first end portions 639b, 639a, respectively, of the unexpanded tube 638. Furthermore, in order to ensure fracture and severance of the doublers 626, 630 at the grooves 640, 644, respectively and not at the relief portions 690, 692, the relief portions 690, 692 define a thickness through the doublers 626, 630 which is greater than thickness of the first and second doublers 626, 630 defined by the first and second grooves 640, 644, respectively. In this regard, upon firing or detonation of the explosive 636 and subsequent expansion of the tube 638 to a circular configuration, the first and second doubler 626, 630 fracture at the first and second staggered groove 640, 644 and bend about the relief portions 690, 692 displaced from the first and second grooves 640, 644, as illustrated in FIG. 8B. As such, less explosive force is required to fracture and bend the doublers 626, 630.

Substantially as described hereinabove in relation to other embodiments, the separation system 620 may further a slide plane means having first and second slide members 660, 664 to further facilitate a relatively collision-free lateral separation and ejection of the first section 648 relative to the second section 652. In this regard, the first and second slide members 660, 664 are interconnected to the first and second sections 648, 652 and are oriented approximately 90° relative to the longitudinally extending first and second doublers 626, 630. As such, these slide members 660, 664 inhibit damage-causing collisions between severed portions 629a, 629b, 633a, 633b of the first and second doublers 626, 630 and with the expanded tube 638 by at least initially inhibiting downward longitudinal movement of the first section 648 relative to the second section 652, as illustrated in FIG. 8C.

In yet another embodiment, illustrated in FIGS. 9A–9C, the first and second staggered grooves 740, 744 of the separation system 720 cooperate with the bend augmentation means 790, 792 on the first and second doublers 726, 730 to provide a relatively collision-free separation of the first section 748 relative to the second section 752. In this embodiment, the second groove 744 on the second doubler 730 is positionable proximate a center portion of the explosive means (e.g., proximate the explosive 736 or a center portion of the tube 738), staggered or offset from the first groove 740, which is positionable along a tangential plane defined by the first end portion 739a of the expandable tube 738 containing the explosive 736. For purposes of enhancing the bendability of the doublers 726, 730 upon detonation of the explosive 636 and expansion of the tube 738, a first bend augmentation means comprising a relief portion 790 is positionable in the first doubler 726 a distance from the first groove 740, proximate (e.g., in alignment with) a second tangential plane defined by a second end portion 739b of the tube 738. Further, bend augmentation means comprising relief portions 792, 794 in the second doubler 730 are positionable on either side of the center positioned second groove 744 in the second doubler 730. In particular, for purposes of enhancing the bendability of the second doubler 730 upon severance of the second doubler 730 at the second groove 744, the relief portion 792, 794 on the second doubler are positionable proximate the first and second tangential planes defined by the first and second ends 739a, 739b of the tube 738. In this regard, as the tube 738 expands to a circular configuration upon detonation of the explosive 736, the severed sections of the doublers 726, 730 are easily bendable about the relief portions 790, 792 and 794, radially outwardly relative to the tube 738. As such, the relief portions 790, 792, 794 on the doublers 726, 730 facilitate bending of the first and second doublers 726, 730 upon expansion of the tube 738. In addition, to ensure fracture of the doublers 726, 730 at the grooves 740, 744 and not at the relief portions 790, 792, 794, thicknesses of the first and second doublers 726, 730 defined by the first and second grooves 740, 744 are less than thicknesses of the first and second doublers 726, 730 defined by the relief portions 790, 792, and 794. Alternatively, the bend augmentation means utilized in this embodiment comprise reinforced portions, which are described hereinabove.

The bend augmentation means of the present invention may also be used in separation systems which utilize opposing or coplanar grooves. Referring to FIGS. 10A–10C, a separation system 820 of the present invention includes first and second doublers 826, 830, an expanding tube explosive charge system contained between the first and second doublers 826, 830, and first and second grooves 840, 844 positioned on the first and second doublers 826, 830, respectively. In this embodiment, the first and second grooves 840, 844 are positioned opposite each other, along a first tangential plane defined by a first end portion 839a of the expandable tube 838 containing the explosive 836. In this regard, upon detonation of the explosive 836, the first and second doublers 826, 830 will fracture at the first and second grooves 840, 844, as illustrated in FIG. 10B.

For purposes of providing first and second doublers 826, 830 which are easily bendable upon detonation of the explosive 836, the separation system 820 further includes first and second bend augmentation relief portions 890, 892 positioned on the first and second doublers 826, 830, respectively. In order to minimize the amount of force required to rotate or bend the first and second doublers 826, 830, the first and second bend augmentation relief portions 890, 892, respectively, are positionable proximate a second tangential plane defined by a second portion 839b of the expandable tube 838. As previously described hereinabove with respect to other embodiments of the present invention, the thickness of the first and second doublers 826, 830 at the relief portions 890, 892, respectively, is greater than the thicknesses of the first and second doublers 826, 830 at the first and second grooves 840, 844, respectively, in order to fracture the first and second doublers 826, 830 at the first and second grooves 840, 844, respectively and to bend the first and second doublers 826, 830 about the relief portions 890, 892, respectively. For purposes of achieving a substantially collision free separation of the first section 848 relative to the second 852, the separation system 820 may further include a slide plane means comprising first and second slide members 860, 864 to at least initially guide the first section 848 at least orthogonally relative to the second section 852, substantially as described hereinabove in relation to other embodiments.

Figure 11C:
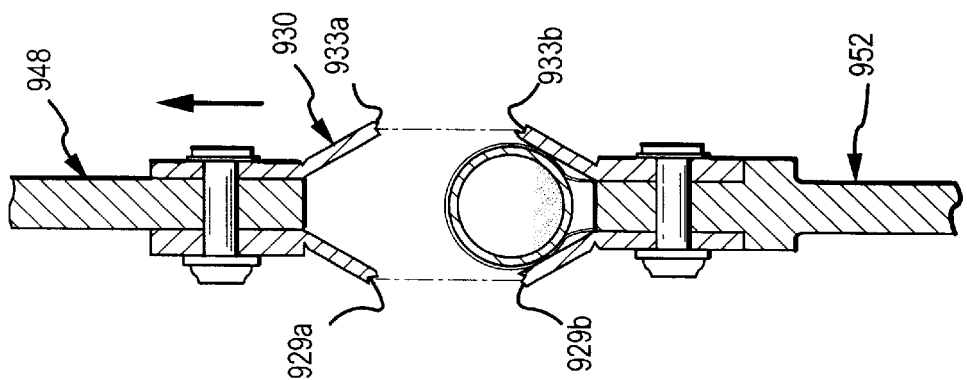
FIGS. 11A–11C illustrate cross-sectional progressive views of another embodiment of the separation system of the present invention.
Figure 11B:
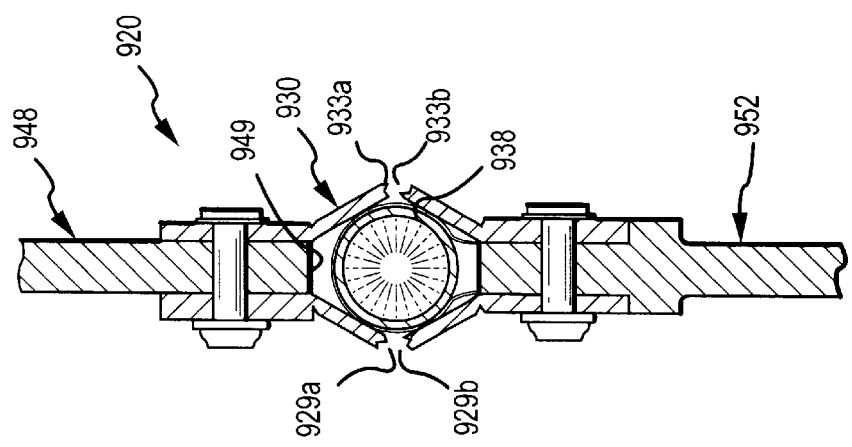
Figure 11A:
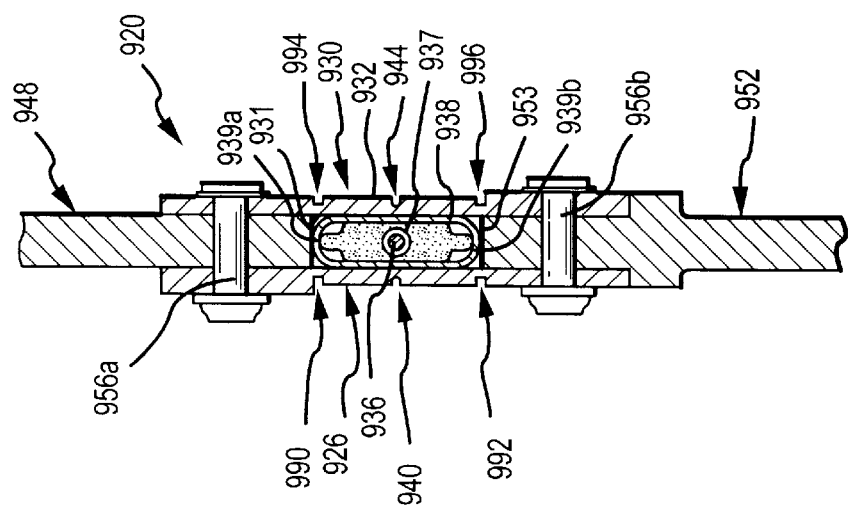

FIGS. 11A–11C illustrate yet another embodiment of the present invention wherein coplanar or opposing grooves on doublers are utilized. In this embodiment, the separation system 920 includes first and second grooves 940, 944 positioned on first and second doublers 926, 930, an explosive means positioned between the first and second doublers 926, 930 and a bend augmentation means for facilitating bending of the first and second doublers 926, 930 upon detonation of the explosive 936. Since at least lateral separation of the first section 948 relative to the second section 952 requires at least some initial longitudinal separation to avoid adverse contact between the expanded tube 938 and the severed end portions 929, 929b, 933a, 933b, this embodiment of the present invention is directed to achieving at least initially a longitudinal separation of the first section 948 relative to the second section 952. Such longitudinal separation may be accomplished by utilizing an ejection system (not shown).

In this embodiment, the first and second grooves 940, 944 on the first and second doublers 926, 930 are positioned proximate a center portion of the explosive 936 or expandable tube 938 . In this regard, upon firing of the explosive 936, forces generated to expand the tube 938 will sever the doublers 926, 930 at the first and second grooves 940, 944, respectively, which correspond areas of maximum diameter of the expanded tube 938. In order to enhance bendability of the doublers 926, 930 having such center positioned grooves 940, 944, respectively, bend augmentation means comprising reinforced portions or relief portions are positionable on the first and second doublers 926, 930, along or proximate first and/or second tangential planes defined by end portions 939a, 939b of the tube 938. In this embodiment, relief portions 990, 992 are positionable on the first doubler 926 and relief portions 994, 996 are positionable on the second doubler 930, along the first and second tangential planes defined by the end portions 939a, 939b of the tube 938. As in the embodiments described hereinabove, to ensure fracture at the grooves and bending at the relief portions, the thickness of the first and second doublers 926, 930 at the first and second grooves 940, 944 is less than the thickness of the first and second doublers 926, 930 at the relief portions 990, 992, 994, 996.

Figures 12A, 12B, 12C:
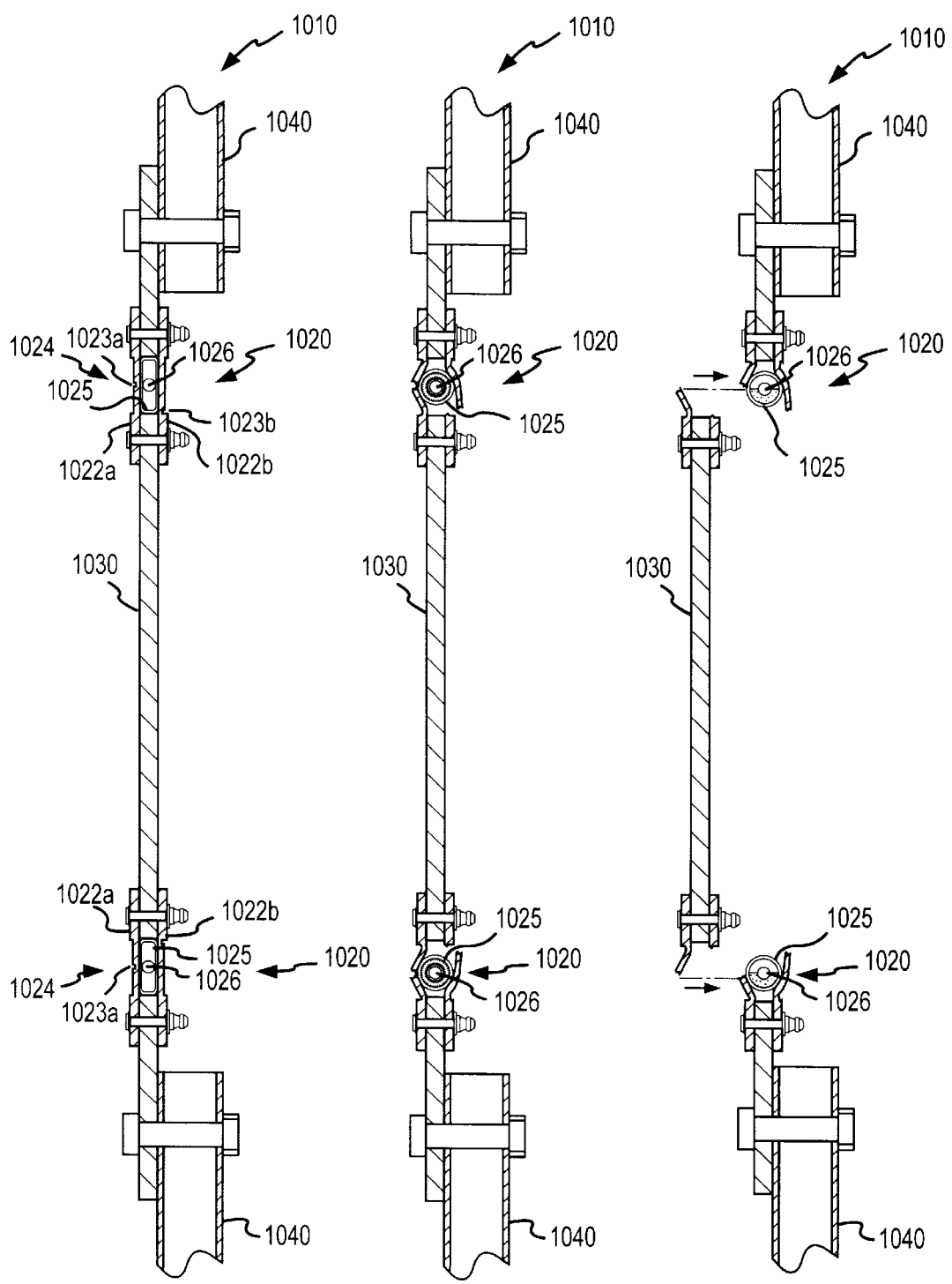
FIGS. 12A–12C illustrate cross-sectional progressive views of an embodiment of another aspect of the present invention.

In another aspect, the present invention is directed to providing a frangible access panel system which is useful in providing quick or emergency access into an interior area of a host structure (e.g., a payload fairing, launch vehicle, spacecraft, aircraft, sea vessel, barrier, etc.). The system of the present invention is particularly useful in facilitating lateral separations of the access panel relative to a longitudinally oriented host structure while causing minimal damage to the host structure or item contained therein (e.g., spacecraft). Advantageously, the system is fully gas and debris contained and is low shock, such that detonation and separation of the system does not pose a fire hazard around flammable fluids. Furthermore, after the emergency or quick access event, the system may be easily replaced, which facilitates reinstallation of the panel back onto the host structure. Referring to FIGS. 12A–12C, the frangible access panel system 1010 of the present invention includes a frangible access joint or separation system 1020 for initially interconnecting the access panel 1030 to the host structure 1040, the separation system 1020 being adapted to separate the access panel 1030 from the host structure 1040 to allow access to the interior of the host structure 1040. In one embodiment, the separation system 1020 includes first and second structural members or doubler plates 1022a, 1022b and an explosive assembly 1024 positioned therebetween, the explosive assembly 1024 for breaking or separating the members 1022a, 1022b upon detonation of the explosive assembly 1024. Such explosive assembly 1024 includes a detonation tube 1025 and a detonation cord 1026 contained therein. Further, the cord 1026 may be encapsulated within a polymeric extrusion inserted within the tube 1025. The detonation tube 1025 may be fabricated from various metals, such as stainless steel. As noted hereinabove with regard to other aspects of the present invention, for purposes of enhancing separation while facilitating a substantially collision-free separation of the access panel 1030 relative to the host structure 1040, and in particular, the severed portions of the members 1022a, 1022b, the separation system 1020 further includes first and second grooves or notches 1023a, 1023b positioned on the members 1022a, 1022b, respectively, such notches defining break planes along which the members separate. In this embodiment, the first and second notches 1023a, 1023b on the first and second members 1022a, 1022b, respectively, are offset or staggered relative to each other, such that the first and second break planes defined by the first and second notches 1023a, 1023b, respectively, are different (e.g., noncoplanar). In this regard, the first notch 1023a may be positioned on the first structural member 1022a proximate the detonation cord 1026 while the second notch 1023b may be positioned along a plane defined by an end portion of the detonation tube 1025, as illustrated in FIG. 12A. In an alternative embodiment, the first and second notches are located along first and second end portions of the detonation tube, respectively.

Figure 13:
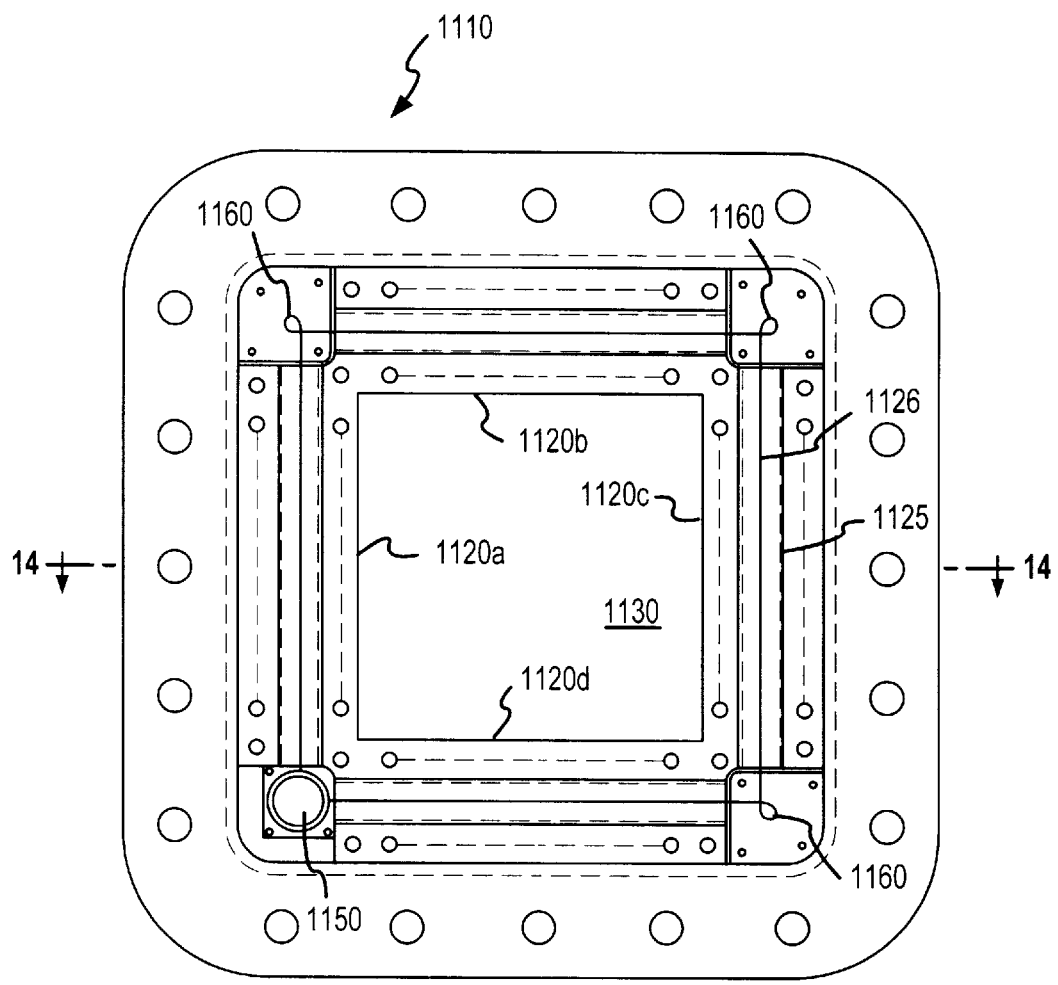
FIG. 13 illustrates a cut-away view of one embodiment of the frangible access panel system of the present invention, the system having ordnance transfer assemblies.
Figure 14:
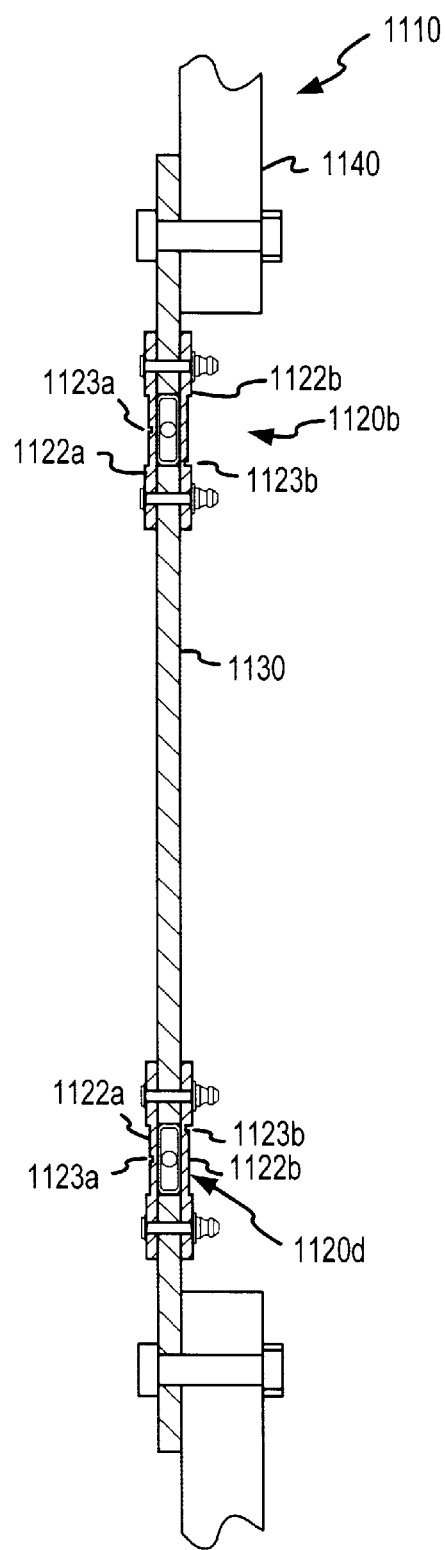
FIG. 14 illustrates a cross-sectional view of the frangible access panel system shown in FIG. 13, taken along line 14—14.

In one embodiment of the frangible access panel system of the present invention, illustrated in FIGS. 13–14, the system 1110 is designed to separate a foursided access panel 1130 from a host structure 1140. In this embodiment, the system 1110 includes first, second, third and fourth separation assembly sections 1120a, 1120b, 1120c, 1120d which initially interconnect and, upon detonation, function to separate, the panel 1130 from the host structure 1140. In this regard, the sections 1120a–1120d extend between respective portions of the host structure 1140 (e.g., first and second side walls and first and second end walls which define an opening in the host structure). Each of the sections 1120a–1120d includes first and second structural members or doubler plates 1122a, 1122b and an explosive assembly having a detonation cord 1126 contained within a detonation tube 1125 positioned between the members 1122a, 1122b. Actuation of the system 1110 is accomplished via initiation of the mild detonation cord 1126, which is a pyrotechnic initiation event which causes the detonating tube 1125 to expand and reshape itself from an oval configuration to a round shape. Such initiation may be remotely controlled for personnel safety. As the tube 1125 expands, such expansion causes the structural members 1122a, 1122b to break in combined shear and tension failure modes, along the staggered notches 1123a, 1123b, which, in turn, results in a predictable, debris-free severance of the members 1122a, 1122b, substantially as described hereinabove with respect to other embodiments of the present invention. Positioning of the first and second notches 1123a, 1123b enables the severed access door or panel 1130 to move in one direction only, as noted in FIGS. 12A–12C. Such unidirectional separation motion limitation precludes the access panel 1130 from entering the interior area of the host structure, which thus reduces the likelihood of any item or system contained within the interior volume of the host structure from being significantly damaged.

The system 1110 further includes a detonator block 1150 capable of initiating detonation of the detonation cord 1126 by applying energy or charge to the cord 1126. The detonator block 1150 includes a primary and a redundant electrical discretes to actuate the system. As noted in the embodiments described hereinabove, the first and second structural members 1122a, 1122b further include first and second notches or grooves 1123a, 1123b which define first and second break planes, respectively, along with the structural members will sever or separate upon detonation of the detonation cord 1126. In this embodiment, for purposes of limiting damage to the host structure during separation of the access panel 1130 relative to the host structure 1140, the first and second notches 1123a, 1123b are offset or staggered relative to each other, such that the first and second break planes defined by the notches are non-coplanar (e.g., different). Where complex curvature and/or small radii of curvature are required, the system 1110 further includes ordnance transfer assemblies 1160. Such ordnance transfer assemblies function to transfer the charge or energy between detonation cords 1125 of the first and second, second and third and third and fourth separation assembly sections without detonation in the corner areas. Utilization of such ordnance transfer assemblies offers the greatest capability to conform to complex contours and small radii of curvature that may be present in the host structure. Ring seals may be utilized to seal the ordnance transfer assemblies 1160 with the panel 1130. Such ordnance transfer assemblies are commercially available from various vendors.

Figure 15:
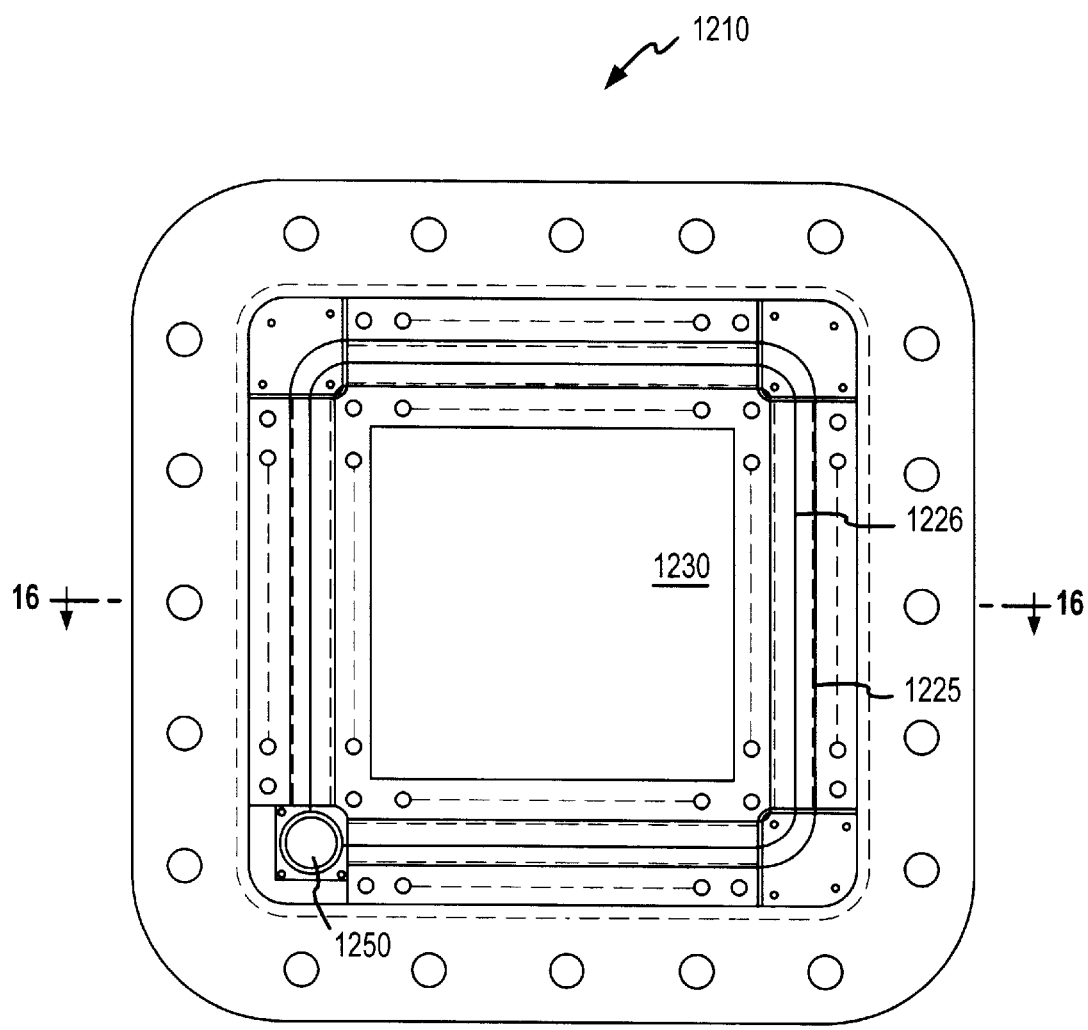
FIG. 15 illustrates a cut-away view of another embodiment of the frangible access panel system of the present invention.
Figure 16:
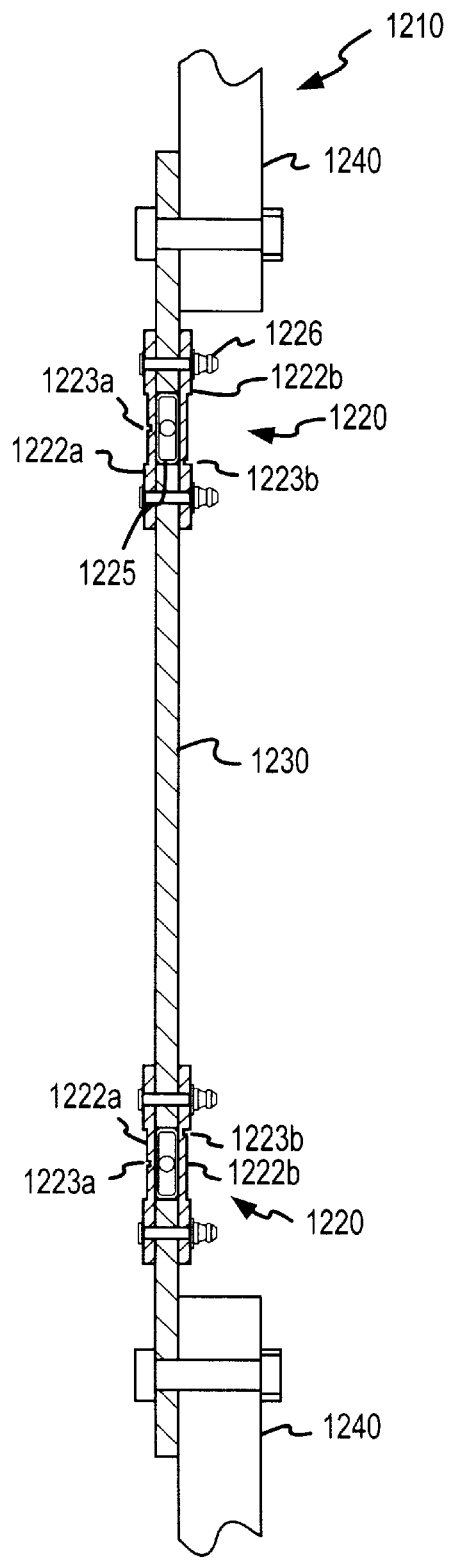
FIG. 16 illustrates a cross-sectional view of the frangible access panel system shown in FIG. 15, taken along line 16—16.

In another embodiment, illustrated in FIGS. 15–16, the frangible access panel system is useful in separating an access panel of simpler configuration and larger radii of curvature from a host structure. Such access panel may be circular, or may include 3 or more sides. In this embodiment, the system 1210 includes a separation system 1220 which initially interconnects and, upon detonation, functions to separate, the panel 1230 from the host structure 1240. In this regard, the separation system 1220 extends between the portions the host structure 1240 (e.g., first and second side walls and first and second end walls which define an opening in the host structure). As with prior described separation systems, the separation system 1220 includes first and second structural members 1222a, 1222b and an explosive assembly having a detonation cord 1226 contained within a detonation tube 1225 positioned between the members 1222a, 1222b. Actuation of the system 1210 is accomplished via initiation of the mild detonation cord 1226. As the tube 1225 expands upon detonation, such expansion causes the structural members 1222a, 1222b to break in combined shear and tension failure modes, along the staggered notches 1223a, 1223b, which, in turn, results in a debris-free severance of the members 1222a, 1222b, substantially as described hereinabove with respect to other embodiments of the present invention. The system 1210 further includes a detonator block 1250 for initiating detonation of the detonation cord 1226 by applying energy or charge to the cord 1226. The detonator block 1250 includes a primary and a redundant electrical discretes to actuate the system. In this embodiment, no ordnance transfer assemblies are utilized since the detonation cord 1226 and detonation tube 1225 extend around the perimeter of the access panel 1230, except where the detonator block 1250 is positioned. In this regard, the detonator tube 1225 is formed to extend between the host structure 1240 and the access panel 1230. Such a formed detonator tube 1225 is useful in instances where complex contours or small radii of curvature are not required.

The foregoing description of the present invention has been presented for purposes of illustration and description. Furthermore, the description is not intended to limit the invention to the form disclosed herein. Consequently, variations and modifications commensurate with the above teachings, and the skill or knowledge of the relevant art, are within the scope of the present invention. The embodiments described hereinabove are further intended to explain best modes known for practicing the invention and to enable others skilled in the art to utilize the invention in such, or other, embodiments and with various modifications required by the particular applications or uses of the present invention. It is intended that the appended claims be construed to include alternative embodiments to the extent permitted by the prior art.

What is claimed is:

1. A system for separating a panel from a host structure, the panel having outer and inner surfaces, laterally spaced first and second side walls and longitudinally spaced first and second end walls, said system comprising:

first, second, third and fourth separation assembly sections extending between first, second, third and fourth portions of the host structure and the first and second side walls and first and second ends walls of the panel, respectively, said sections each comprising first and second members interconnecting said portions of the host structure and said walls of the panel and an explosive assembly interposed therebetween; and a detonator member for initiating detonation of said explosive assemblies to break said first and second members, wherein the panel is separable from the host structure.

2. A system as claimed in claim 1, wherein at least said first separation assembly section further comprises first and second notches located on said first and second members, respectively, of said first separation assembly section, wherein said first and second members are fracturable at said first and second notches, respectively, upon detonation of said explosive assembly.

3. A system as claimed in claim 2, wherein said first and second notches of at least said first separation assembly section are in first and second planes, said first plane being noncoplanar with said second plane.

4. A system as claimed in claim 2, wherein first and second end portions of said explosive assembly of at least said first separation assembly section defines first and second planes, wherein said first and second notches are coplanar with said first and second planes, respectively.

5. A system as claimed in claim 2, wherein said explosive assembly of at least said first separation assembly section includes a detonation cord, wherein said first notch on said first member is coplanar with said detonation cord.

6. A system as claimed in claim 1, wherein said detonator member is interposable between said first and second separation assembly sections.

7. A system as claimed in claim 1, further comprising:
first, second and third ordnance transfer assemblies interposable between said second and third, said third and fourth, and said fourth and first separation assembly sections, respectively.

8. A system as claimed in claim 1, further comprising:
a first holding member for supporting the panel after detonation of said detonator member.

9. A system for separating an access member from a wall of a host structure to provide access to an interior area of the host structure, the access member having an outer wall defining a perimeter of the access member, said system comprising:
a separation system, extending between the host structure and the access member, for separating the access member from the host structure, said separation system including an explosive assembly interposable between first and second interconnect members for breaking said first and second interconnect members, wherein said first and second interconnect members are interconnectable to the host structure and the access member; and
a detonation member for initiating detonation of said explosive assembly by providing energy to said explosive assembly.

10. A system as claimed in claim 9, wherein said first and second interconnect members include first and second grooves, respectively, wherein said first and second interconnect members are breakable along first and second break planes defining an area of separation, respectively, said first and second break planes corresponding to said first and second grooves, respectively.

11. A system as claimed in claim 10, wherein said first and second break planes are different and non-coplanar.

12. A system as claimed in claim 10, wherein said explosive assembly includes a detonation cord, wherein said first groove is alignable with said detonation cord and said second groove is alignable with a first end portion of a detonator tube enclosing said detonation cord.

13. A system as claimed in claim 9, wherein the perimeter of the access wall includes at least a first corner portion, wherein said explosive assembly includes a detonation cord, said separation system including at least a first ordnance transfer assembly positionable at the first corner portion between first and second portions of said detonation cord, said first ordnance transfer assembly for transferring said energy from said first portion of said detonation cord to said second portion of said detonation cord.

* * * * *

UNITED STATES PATENT AND TRADEMARK OFFICE
CERTIFICATE OF CORRECTION

PATENT NO. : 6,298,786 B1
DATED : October 9, 2001
INVENTOR(S) : Grosskrueger et al.

It is certified that error appears in the above-identified patent and that said Letters Patent is hereby corrected as shown below:

<u>Column 22,</u>
Line 19, delete the word "comer," and insert therefor -- corner --;
Line 22, delete the word "comer," and insert therefor -- corner --.

Signed and Sealed this

Twenty-eighth Day of May, 2002

*Attest:*

*Attesting Officer*

JAMES E. ROGAN
*Director of the United States Patent and Trademark Office*